US010341465B2

(12) United States Patent
Krishnamoorthy et al.

(10) Patent No.: US 10,341,465 B2
(45) Date of Patent: Jul. 2, 2019

(54) POLICY DRIVEN FLIGHT MANAGEMENT

(71) Applicant: MICROSOFT TECHNOLOGY LICENSING, LLC, Redmond, WA (US)

(72) Inventors: Shobana Krishnamoorthy, Redmond, WA (US); Ilker Celikyilmaz, Kirkland, WA (US); Randy David Thomson, Redmond, WA (US); Min Shao, Bellevue, WA (US); Divyachapan S. Padur, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/196,069

(22) Filed: Jun. 29, 2016

(65) Prior Publication Data

US 2017/0286080 A1    Oct. 5, 2017

Related U.S. Application Data

(60) Provisional application No. 62/317,610, filed on Apr. 3, 2016.

(51) Int. Cl.
*G06F 8/65* (2018.01)
*H04L 29/08* (2006.01)
*G06F 8/71* (2018.01)

(52) U.S. Cl.
CPC .......... *H04L 67/34* (2013.01); *G06F 8/65* (2013.01); *G06F 8/71* (2013.01); *H04L 67/1097* (2013.01)

(58) Field of Classification Search
CPC ........ H04L 67/1097; H04L 67/34; G06F 8/60
See application file for complete search history.

(56) References Cited

U.S. PATENT DOCUMENTS 6,523,166 B1 * 2/2003 Mishra ............... G06F 8/61
  707/999.104
7,103,351 B2   9/2006 Chaudhari et al.
(Continued)

OTHER PUBLICATIONS

"A Method and System to Efficiently Orchestrate Continuous Integration and Continuous Deployment in an Enterprise IaaS Cloud Environment", In Proceeding IP.com journal, Mar. 21, 2016, pp. 1-11.

(Continued)

*Primary Examiner* — Wei Y Zhen
*Assistant Examiner* — Amir Soltanzadeh
(74) *Attorney, Agent, or Firm* — Michael Best & Friedrich LLP

(57) ABSTRACT

A hosted service may include multiple applications and have a large number of active features, each in varying stages of deployment, that are gradually rolled out in one or more deployment environments. The hosted service may include a flight state machine, which may provide policy based flight management for feature rollout. For example, in response to receipt of a flight request associated with a feature of the hosted service, the flight state machine may be configured to retrieve a policy associated with rollout of the feature, determine a flight state, and determine a deployment state of the feature. The flight state machine may then be configured to initiate or continue deployment of the feature in a current deployment environment or initiate deployment of the feature in a next environment based on the policy, the flight state, and the deployment state of the feature.

17 Claims, 17 Drawing Sheets

(56) References Cited

U.S. PATENT DOCUMENTS

| | | | |
|---|---|---|---|
| 7,167,914 B2 | 1/2007 | Cohen et al. | |
| 7,555,551 B1 | 6/2009 | McCorkendale et al. | |
| 7,735,097 B2 | 6/2010 | Kovachka-Dimitrova et al. | |
| 8,037,025 B2 | 10/2011 | Fang et al. | |
| 8,108,497 B2 | 1/2012 | Biancardini et al. | |
| 8,214,451 B2 | 7/2012 | Grossner et al. | |
| 8,370,828 B2 | 2/2013 | Bankston et al. | |
| 8,572,679 B1 | 10/2013 | Wang et al. | |
| 8,572,706 B2 | 10/2013 | Lucovsky et al. | |
| 8,595,331 B2 | 11/2013 | Henseler et al. | |
| 8,856,361 B2 | 10/2014 | Friedman | |
| 9,176,728 B1* | 11/2015 | Dixit | G06F 8/71 |
| 9,235,402 B2* | 1/2016 | Carpenter | G06F 8/65 |
| 9,560,120 B1* | 1/2017 | Allen | G06F 8/68 |
| 2004/0225391 A1* | 11/2004 | Fromherz | G06Q 10/06 |
| | | | 700/97 |
| 2008/0209016 A1* | 8/2008 | Karve | G06F 8/61 |
| | | | 709/221 |
| 2008/0263534 A1* | 10/2008 | Hirsave | G06F 21/577 |
| | | | 717/168 |
| 2013/0036328 A1* | 2/2013 | Mutisya | G06F 11/3688 |
| | | | 714/15 |
| 2013/0204746 A1 | 8/2013 | Lee et al. | |
| 2015/0378701 A1 | 12/2015 | Cai et al. | |

OTHER PUBLICATIONS

Gunalp, Ozan Necati, "Continuous Deployment of Pervasive Applications in Dynamic Environments", Retrieved From <<https://tel.archives-ouvertes.fr/tel-01215029/document>>, Nov. 13, 2014, 54 Pages.

"International Search Report and Written Opinion Issued in PCT Application No. PCT/US2017/024647", dated Jun. 29, 2017, 12 Pages.

"Feature Flagging and Staged Rollout", Published on: Jul. 29, 2014 Available at: http://apptimize.com/docs/advanced-functionality/feature-flagging-and-staged-rollout/.

* cited by examiner

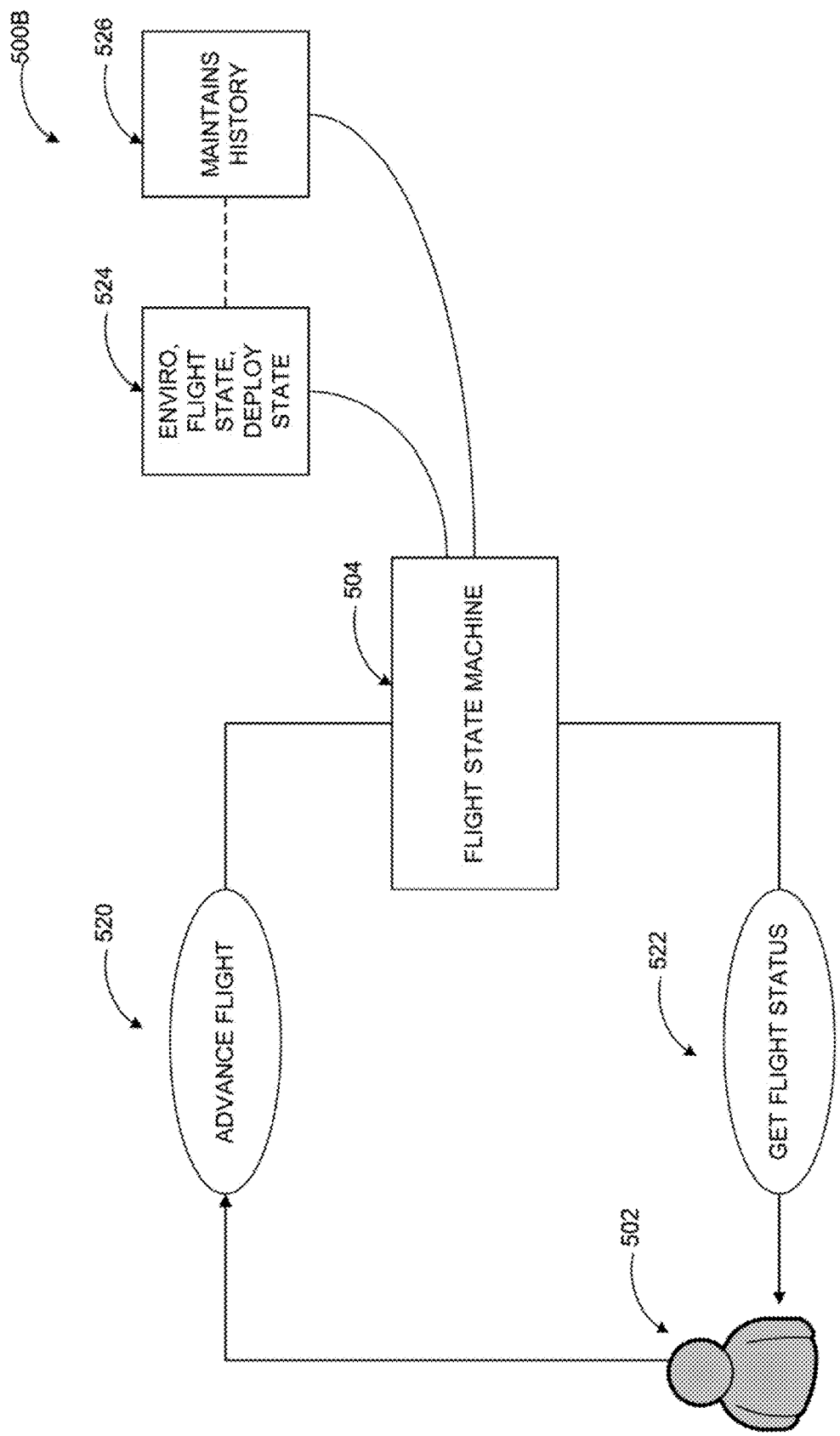

POLICY DRIVEN FLIGHT MANAGEMENT

CROSS-REFERENCE TO RELATED APPLICATION

This application is a non-provisional application under 35 U.S.C. § 119(e) of U.S. Provisional Application No. 62/317,610 filed on Apr. 3, 2016. The U.S. Provisional Application is herein incorporated by reference in its entirety.

BACKGROUND

In today's increasingly networked computing environments, big and versatile hosted services may include multiple applications and have a large number (e.g., thousands) of active features that are in different stages of deployment. New features are usually gradually enabled and/or introduced to online customers. The process that controls the gradual rollout or deployment is also referred to as a "flight." Although many features may follow a similar deployment schedule or itinerary, there is no one size fits all approach. This may make it harder to build a flight management system to handle the ever changing requirements, schedules, and itineraries of thousands of features. Conventional deployment systems are managed by developers by manually checking in a configuration file (e.g., one per environment/ring) to gradually rollout the feature.

Some of the challenges with conventional approaches may include, but are not limited to, lack of gradual rollout protection; lack of real ring validation for flight configurations; unreliable flight train delivery and hot synchronization problems; incremental builds of flights not being able to catch basic errors, leading potentially to costly build breaks; lack of proper/full proof build time validation; developer need to manage one initial configuration per environment; user making mistakes in generating initial configurations causing high number of problem escalations; and lack of control of how fast a feature is deployed to environments.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to policy driven flight management for gradual rollout of a feature of a hosted service. The hosted service may include a flight state machine which may provide the policy based flight management for feature rollout. For example, in response to receipt of a flight request associated with a feature of the hosted service, the flight state machine may be configured to retrieve a policy associated with rollout of the feature from a policy store, where the rollout includes one or more deployment environments. The flight state machine may also be configured to determine a flight state, and determine a deployment state of the feature. Based on the policy, the flight state, and the deployment state of the feature, the flight state machine may then be configured to initiate or continue deployment of the feature in a current deployment environment or initiate deployment of the feature in a next environment.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIGS. 5A-G illustrate examples of policy based flight management implemented by a flight state machine;

DETAILED DESCRIPTION

Figure 1:
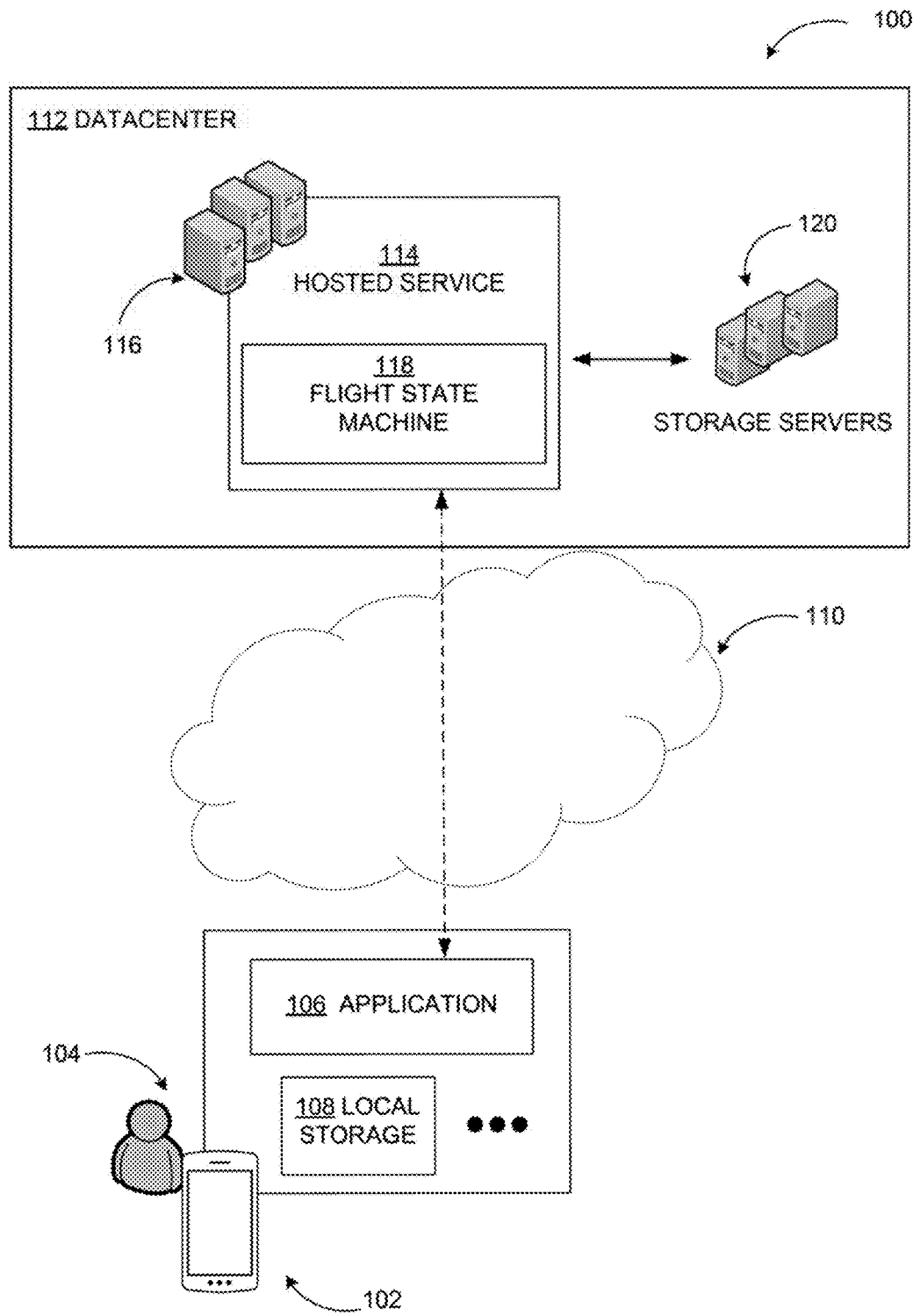
FIG. 1 includes an example network environment where policy based flight management may be implemented.

As briefly described above, policy driven flight management may be implemented for gradual rollout of a feature of a hosted service. The hosted service may include a flight state machine, which may provide the policy based flight management for the feature rollout, where the rollout includes one or more deployment environments. In example embodiments, a developer may create the feature of the hosted service. Upon creation, the feature may be associated with a flight that describes a process for how the feature is to be deployed. In response to receipt of a flight request to advance, suspend, resume, deactivate, or delete the flight, the flight state machine may be configured to retrieve a policy associated with rollout of the feature from a policy store. The policy may include one or more rules associated with properties for the rollout. For example, the rules may define the deployment environments and define criteria for initiating the deployment of the feature in a next deployment environment, among other examples. The flight state machine may also be configured to determine a flight state as created, active, suspended, resumed, expired or deleted, and determine a deployment state of the feature as not started, deploying, completed, or failed. Based on the policy, the flight state, and the deployment state of the feature, the flight state machine may then be configured to initiate or continue deployment of the feature in a current deployment environment or initiate deployment of the feature in a next environment.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a hosted service with gradual feature rollout. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A policy as used herein refers to a compilation of rules associated with a rollout of one or more features within a hosted service. Each rule may define one or more properties associated with the rollout. For example, one rule may define criteria for moving the deployment of a feature from a current deployment environment (also referred to as a ring or stage) to a next deployment environment. Another rule may define a relationship between the deployments of two different features of the hosted service. Some rules may be applicable to individual features only. Other rules may be applicable to groups of features. Further rules may be applicable to all rules within a policy. Rollout of a feature may be managed based on a single policy or a multitude of policies. For example, different policies may be used for the rollout of a feature in conjunction with different applications within the hosted service.

Embodiments may be implemented on a variety of hosted service types such as on premise services, third party services, and others. Moreover, automatic rollout may be employed based on the rules/policies and the signals collected from the deployment environments. Configurations (or flights) may be generated automatically based on applicable policies or rules. Furthermore, local scope management may be enabled to test deployment of the feature in low-risk environments using a system described herein.

FIG. 1 includes an example network environment where a system for policy driven flight management may be implemented.

As illustrated in diagram 100, an example system may include a hosted service 114 of a datacenter 112. The hosted service 114 may include multiple applications and have a large number of active features, each in varying stages of deployment, that are gradually rolled out. The datacenter 112 may include one or more processing servers 116, of which, at least one may be operable to execute a flight state machine 118 of the hosted service 114, among other components. The datacenter 112 may also include one or more storage servers 120 configured to manage one or more data stores comprising data associated with the flight state machine 118. As described herein, the flight state machine 118 may be implemented as software, hardware, or combinations thereof.

In some embodiments, the hosted service 114 may interact with customers over one or more networks. For example, as illustrated in the diagram 100, a customer 104 may execute a thin (e.g., a web browser) or a thick (e.g., a locally installed client application) version of an application 106 through a device 102 over network 110. The application 106 may be one of a variety of applications provided by the hosted service 114, for example. The device 102 may include a desktop computer, a laptop computer, a tablet computer, a vehicle mount computer, a smart phone, or a wearable computing device, among other similar devices.

In one embodiment, the customer 104 (a software developer, for example) may be enabled to create a new feature of the hosted service 114. The flight state machine may be configured to associate the feature with a flight, where the flight describes a process for how the feature is to be deployed. In some examples, the flight may be generated automatically by the flight state machine based on applicable policies or rules associated with the feature and/or based on metadata associated with the customer 104. The customer 104 may then submit a flight request to advance the flight, deactivate the flight, suspend the flight, resume the flight, or delete the flight. In response to detecting the flight request, the flight state machine 118 may be configured to retrieve a policy associated with the rollout of the feature from a policy store. In some embodiments, policies associated with the rollout of the feature for each application within the hosted service may be retrieved (if they are different for each application) from the policy store. The policy store may be located within the storage servers 120, for example. Additionally, the policy may be stored locally in a local storage 108 of the device 102, and thus may also be retrieved from the local storage 108. The policy may include a compilation of rules that define properties associated with the feature rollout. The rules may be applicable to the feature itself and/or the rules may be applicable to a group of features to which the feature belongs. The rules may define at least one or more deployment environments for the feature rollout, criteria for initiating deployment of the feature within a next deployment environment, and a relationship between deployments of the feature and another feature of the hosted service 114, for example. In some embodiments, the customer 104 may be enabled to add, modify, and/or delete one or more of the rules of the policy prior to deployment such that the flight configuration and/or a deployment strategy, among other things, may be adjusted as needed by the customer 104.

The flight state machine 118 may then be configured to determine a flight state and a deployment state of the feature. The flight state may be determined to be created, active, suspended, expired, or deleted. The deployment state of the feature may be determined to be not started, deploying, completed, or failed. The flight state machine 118 may further be configured to initiate and/or continue deployment of the feature in a current deployment environment or initiate deployment of the feature in a next deployment environment based on the rules of the policy, the flight state, and the deployment state of the feature. In the latter scenario, the deployment of the feature in the current deployment environment must be validated prior to initiating deployment of the feature in the next deployment environment based on the policy, the flight state, and the configuration deployment state of the feature.

In an example scenario, the customer 104 may create a color scheme based feature for a presentation application. The customer 104 may define a policy with one or more rules associated with the feature, where the policy is stored within the policy store. For example, one rule may define four deployment environments for rollout of the feature: a design stage exposing the feature to a group of developers, a first test stage exposing the feature to internal users, a second test stage or "first release" exposing the feature to a small group of external users, and then a production stage or "global release" exposing the feature to all external users. The purpose of the deployment environments may be to diminish a risk of issues associated with deployment and functioning of the feature as the feature is increasingly exposed to a larger number of users in each stage, for example. Another rule may include criteria for when deployment of the feature may be initiated in a next deployment environment, such as validation time period for the deployment of the feature in a current deployment environment, a risk level of the deployment of the feature in the next deployment environment, and a speed of the deployment of the feature. To provide an illustration, a rule may define that deployment of the feature may be initiated in the second test stage even if the deployment of the feature fails in the first test stage, however if it again fails in the second test stage, then deployment of the feature must at least be suspended.

Therefore, in response to the flight state machine 118 receiving a flight request to advance a flight associated with the color scheme based feature, the flight machine 118 may retrieve the policy from the policy store, determine a flight state, and determine the deployment state of the feature. For example, the flight state may be determined to be active following the flight request to advance the flight, and the feature may be deploying in the first stage environment. Based on the policy, the flight state, and the deployment state of the feature, the flight state machine 118 may be configured to continue deployment of the feature within the first stage environment, and/or initiate deployment of the feature within the second test stage since it is not dependent on a successful deployment within the first test stage.

In some embodiments, the customer 104 may receive reports associated with the rollout of the feature that include among other things, a flight state, a deployment state of the feature, and the current deployment environment, for example. In further embodiments, local scope management may be enabled such that the customer 104 may test the flight in limited, low-risk environments prior to rolling out the feature globally. In an example scenario, the customer 104 may select up to 5 individuals to test user local scope flights, 5 tenants to test tenant local scope flights, and/or 5 farms to test "m" local scope flights, where the users are tested first followed by the tenants and then the farms. If the test of the flight is successful within each environment, then the flight may be used for the global rollout of the feature. If the test is not successful, the customer 104 may be configured to adjust and/or modify the flight and retest.

A large and versatile hosted service may include multiple applications and have thousands of active features in varying stages of deployment throughout one or more environments. While many of the features may follow a similar deployment schedule, there is no one size fits all approach to gradually rollout or deploy the features to online customers. As a result, conventional deployment systems are managed by human developers, who check a configuration file for each environment to gradually rollout the features. Such systems are less reliable (humans by nature are prone to make mistakes and errors) and both time and cost inefficient. Based on the embodiments described above in FIG. 1, implementation of policy based flight management may, among other things, increase efficiency and reliability of feature deployments, reduce processing and network bandwidth usage (reduced number of communications on feature deployments), enhance security through gradual rollouts, mitigate risks associated with global rollouts, and improve user interaction by allowing developers to define and/or modify policy rules prior to deployment and receive status reports.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of applications with thousands of features to be rolled out on varying deployment schedules.

Figure 2:
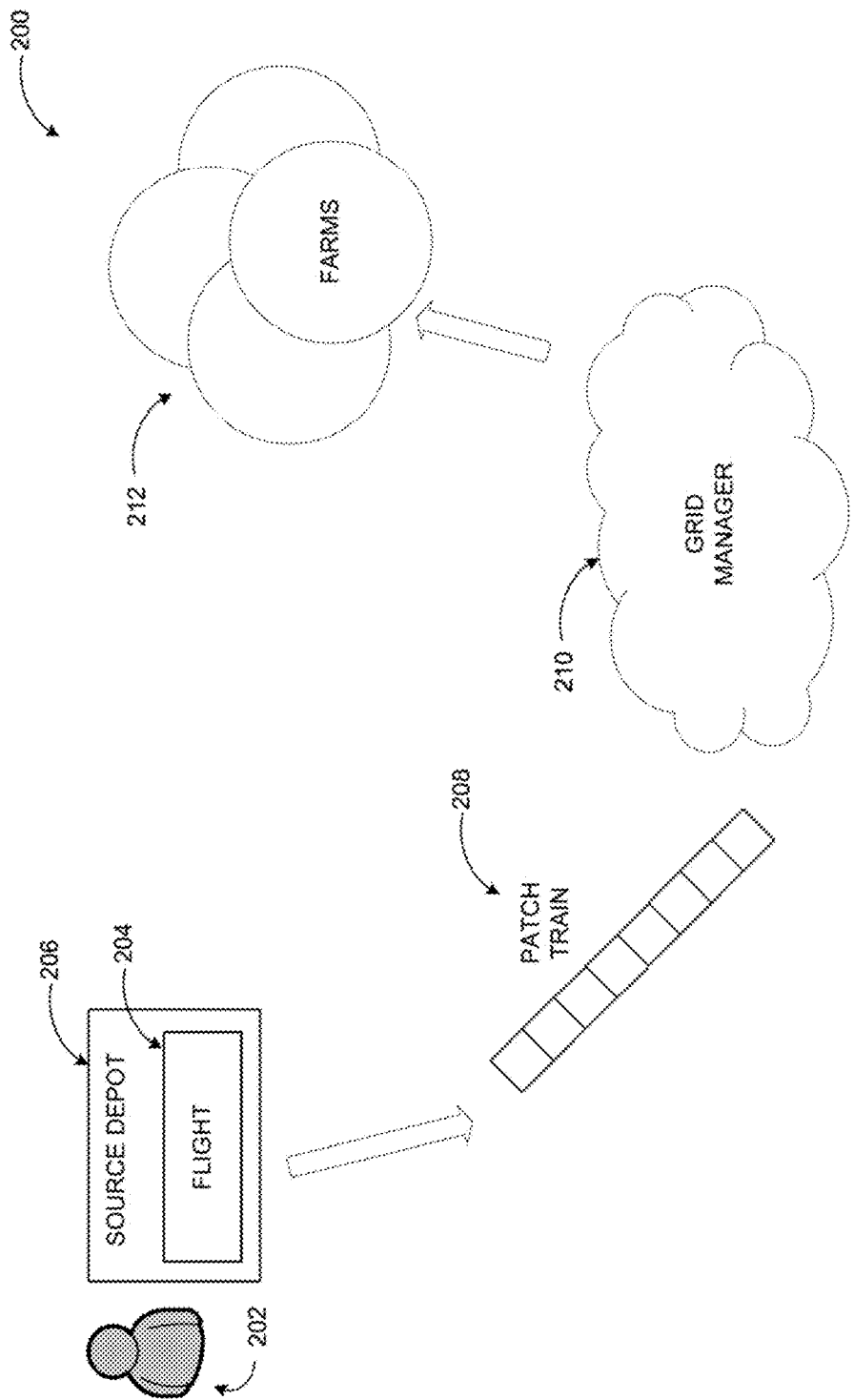
FIG. 2 includes an example infrastructure implemented to provide policy based flight management.

FIG. 2 includes an example infrastructure implemented to provide policy based flight management. As shown in a diagram 200, a developer 202 may create a feature for a hosted service. The feature may be associated with a flight 204, where the flight 204 may describe a process for how to deploy the feature throughout one or more deployment environments. The developer may check the flight 204 into a source depot 206. In other embodiments, a flight state machine may be configured to automatically generate the flight 204 based on policies associated with the feature and/or metadata associated with the developer 202, and provide the flight 204 to the source depot 206. The configuration of the flight 204 may be user based, tenant based, a user release track, a tenant release track, configured on a number line, farm based, network based, based on farm labels, based on a rotation seed, a generic rotate percentage configuration, a search flight based on farm scope, or a registry, among other examples.

The checked in flight 204 may be pushed within 10-20 minutes, for example, to hot synchronization locations in each of the deployment environments. One or more computing devices or servers managed by a grid manager 210 may be configured to operate as a patch train 208. The computing devices or servers operating as the patch train 208 may retrieve the flight 204 from the hot synchronization locations to test deployment of the feature within each of the respective deployment environments. In some embodiments, the computing devices or servers operating as the patch train 208 may update the feature and/or the flight 204 to improve performance and/or deployment of the feature within each environment, and then may push the updated feature and/or flight 204 to local applications within each deployment environment. Initially, the flight 204 may be pushed to more limited deployment environments such that the feature is only deployed to a small group of users, for example, a group of developers. Ultimately, the flight 204 may be pushed to one or more servers farms 212 such that the feature may be deployed globally to all user.

Figure 3:
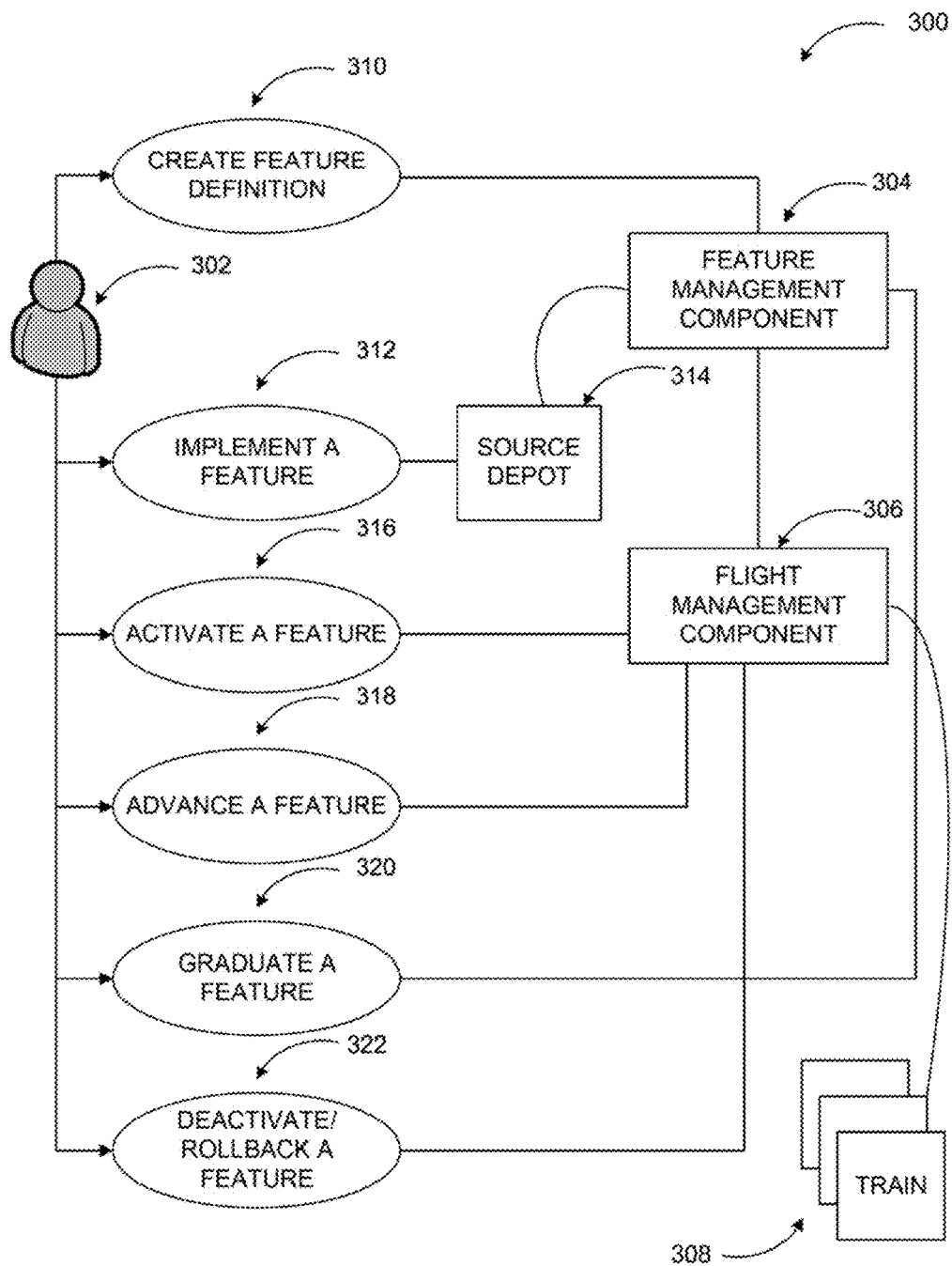
FIG. 3 illustrates an example system for providing policy based flight management for gradual feature rollout of a hosted service.

FIG. 3 illustrates an example system for providing policy based flight management for gradual feature rollout of a hosted service. The hosted service may include multiple applications and have a large number of active features, each in varying stages of deployment, that are gradually rolled out. A flight state machine of the hosted service may be configured to provide policy based flight management for the feature rollouts.

As shown in a diagram 300, the flight state machine may include a feature management component 304 and a flight management component 306, among other components. Additionally, the flight state machine may include a policy management component that enables a developer 302 to define a policy associated with each of the features. The policy may include one or more rules for deployment of the features throughout one or more deployment environments. For example, the rules may define criteria for initiating the deployment of the feature in a next deployment environment. The criteria may include a validation time period for the deployment of the feature in a current deployment environment, a risk level of the deployment of the feature, and a speed of the deployment of the feature, among other criteria.

The developer 302 may request to create a feature definition 310 for a new feature of the hosted service, where the feature definition includes a feature name, a number line, and a meta type, among other examples. In response to the request, the feature management component 304 may be configured to create the new feature, where the feature may be associated with a flight that describes a process for how the feature is to be deployed. Additionally, upon request from the developer 302 to implement a feature 312, the feature management component 304 may be configured to publish a flight framework application programming interface (API) with experimental feature code within a source depot 314. Furthermore, upon request from the developer 302 to graduate a feature 320, the feature management component 304 may be configured to delete and/or remove the experimental feature code from the source depot 314, as well as delete the feature definition created.

Upon request from the developer 302 to activate a feature 316, the flight management component 306 may be configured to retrieve the feature and flight from the feature management component 304. The flight management component 306 may be configured to control creation and/or modification of the flight, implement the flight to advance the feature 318 upon request from the developer 302, and/or delete the flight once the feature is graduated or to deactivate/rollback 322 the feature upon request from the developer 302.

In an example scenario, the flight management component 306 may be configured to push the flight to hot synchronization locations in each of the deployment environments to activate the feature 316. One or more computing devices or servers operating as a patch train 308 may retrieve the flight from the hot synchronization locations to test deployment of the feature within each of the respective deployments environments. In some embodiments, the computing devices or servers operating as the patch train 308 may update the feature and/or the flight to improve performance and deployment of the feature within each environment, and then may push the updated feature and/or flight configuration to local applications within each deployment environment. If the tests are successful, the flight management component 306 may be configured to initiate deployment of the feature in a next deployment environment. The flight management component 306 may further be configured to keep track of any activity associated with the deployment of feature, in order to persist a history and provide reports to the developer 302.

Additionally or alternatively, the developer 302 may enable and advance the feature in each of the deployment environments through a flight management service, for example, provided by the hosted service.

Figure 4:
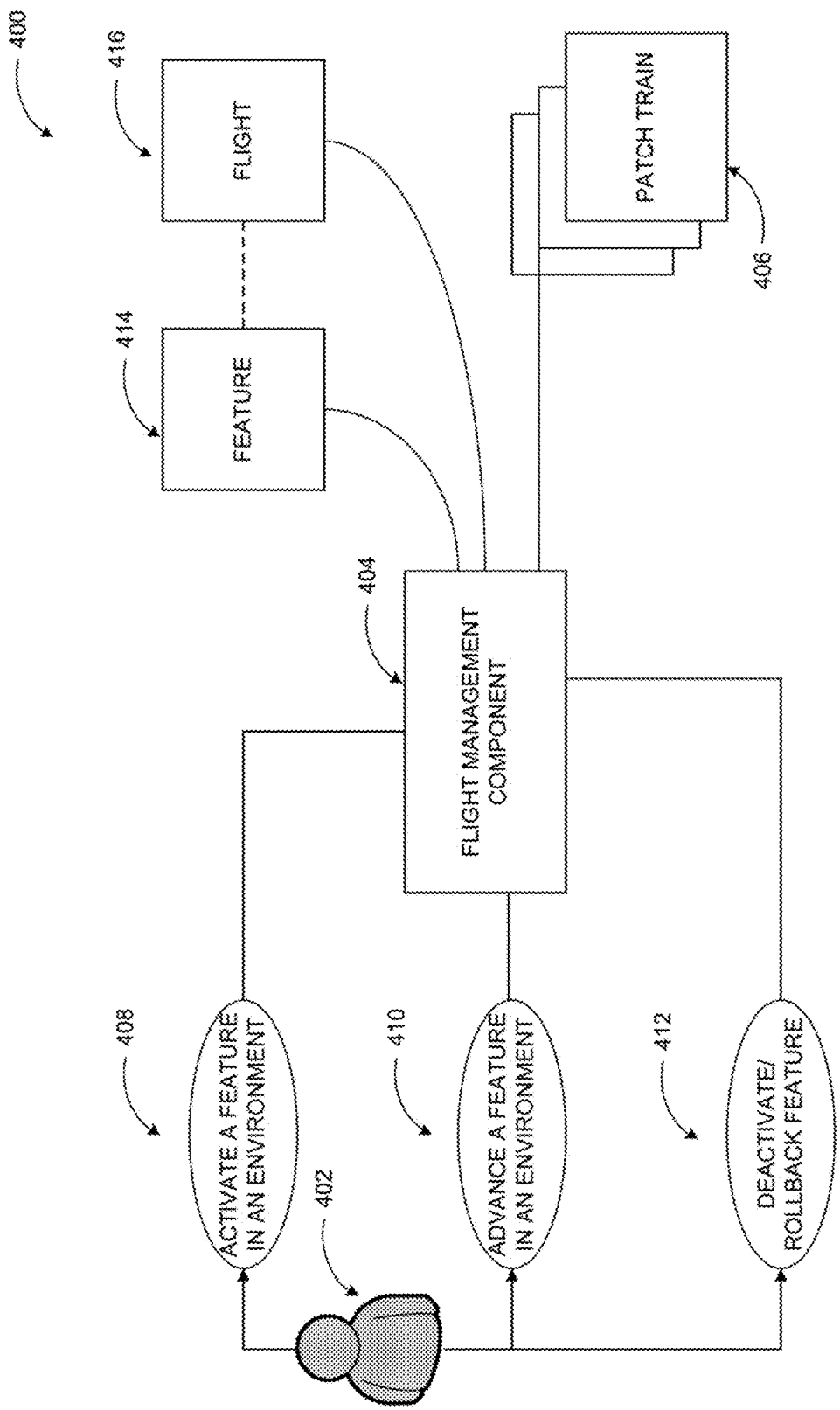
FIG. 4 illustrates an overview of processes performed by a flight management component.

FIG. 4 illustrates an overview of processes performed by a flight management component. A hosted service may include a flight state machine configured to provide policy based flight management for feature rollout. As shown in a diagram 400, the flight state machine may include a flight management component 404, among other components. A developer 402 may create a feature for the hosted service, and may define policies associated with the feature, including rollout of the feature. The policy associated with the rollout of the feature may include one or more rules for deployment of the feature throughout one or more deployment environments. For example, the rules may define the deployment environments and minimum requirements that must be met for the features to move from one deployment environment to another.

Upon request from a developer 402 to activate a feature 408 in a particular deployment environment, the flight management component 404 may be configured to retrieve the feature 414 and a flight 416 that describes a process for deployment of the feature 414 from a feature management component (refer back to FIG. 3 for a detailed description of the feature management component, and its functions). The flight management component 404 may be configured to control creation and/or modification of the flight 416, implement the flight 416 to advance the feature 410 in the particular environment upon request from the developer 402, and/or delete the flight 416 to deactivate/rollback 412 the feature in the environment upon request from the developer 402.

In an example scenario, the flight management component 404 may be configured to push the flight 416 to a hot synchronization location in the particular deployment environment. One or more computing devices or servers operating as a patch train 406 may retrieve the flight 416 from the hot synchronization location to test deployment of the feature 414 within the particular environment. Once the deployment of the feature 414 is successful in the particular deployment environment, the flight management component 404 may be configured to to push the flight 416 to a hot synchronization location in a next deployment environment, where the process may be repeated.

FIGS. 5A-G illustrate examples of policy based flight management implemented by a flight state machine. A hosted service may include multiple applications and have a large number of active features, each in varying stages of deployment, that are gradually rolled out. A flight state machine 504 of the hosted service may be configured to provide policy based flight management for the feature rollouts. For example, as shown in diagrams 500A-G, the flight state machine 504 of may be configured to create and/modify a flight associated with a feature, advance the flight, suspend/resume the flight, deactivate or delete the flight, and add/remove a local scope management to the flight in response to one or more flight requests from a developer 502.

Figure 5A:
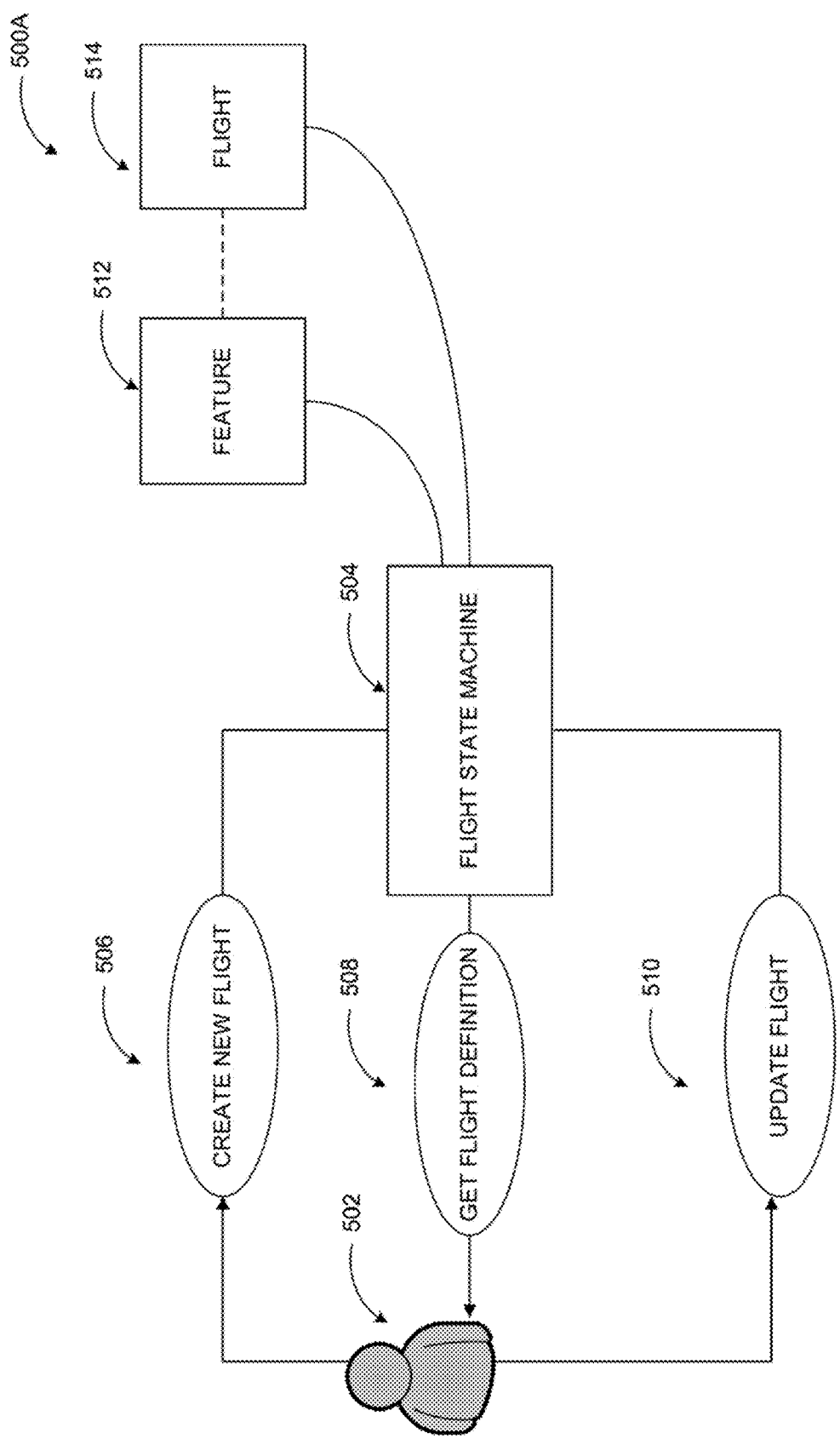

In diagram 500A of FIG. 5A, a developer 502 may create a new flight 506, where a flight 514 may describe how to deploy a feature 512 of the hosted service throughout one or more deployment environments for rollout. In response, the flight state machine 504 may request to get a flight definition 508 associated with the flight 514 from the developer 502. The flight definition may include a feature name, a flight type, a policy id, a feature id, a number line, a version, a team, a description, and an expiration date, among other examples. The flight state machine 504 may then be configured to update 510 the flight 514 based on the flight definition received.

In diagram 500B of FIG. 5B, the flight state machine 504 may receive a flight request from the developer 502 to advance the flight 520. In response, the flight state machine 504 may be configured to retrieve policy associated with the rollout of the feature, determine a flight state and a deployment state of the feature within a current deployment. The flight state may be determined to be active, for example, following the request from the developer 502 to advance the flight 520 (see FIG. 7 for an illustration of the process). The deployment state may be not started if the feature has not yet deployed, deploying if the feature is in the process of deploying, completed if the feature has successfully deployed, or failed if the feature failed to deploy. Based on the policy, the flight state, and the deployment state of the feature the deployment of the feature may be initiated or continued within the current deployment environment or the deployment of the feature may be initiated within a next deployment environment as defined by the policy.

The flight state machine 504 may be configured to collect updated information such as the current deployment environment, the flight state, and the deployment state, among other information 524, to generate a current flight status 522, which may be provided to the developer 502. The flight state machine 504 may be configured to track any activity associated with the flight and/or feature deployment, including the activation of the flight, to maintain and persist a history 526.

Figure 5C:
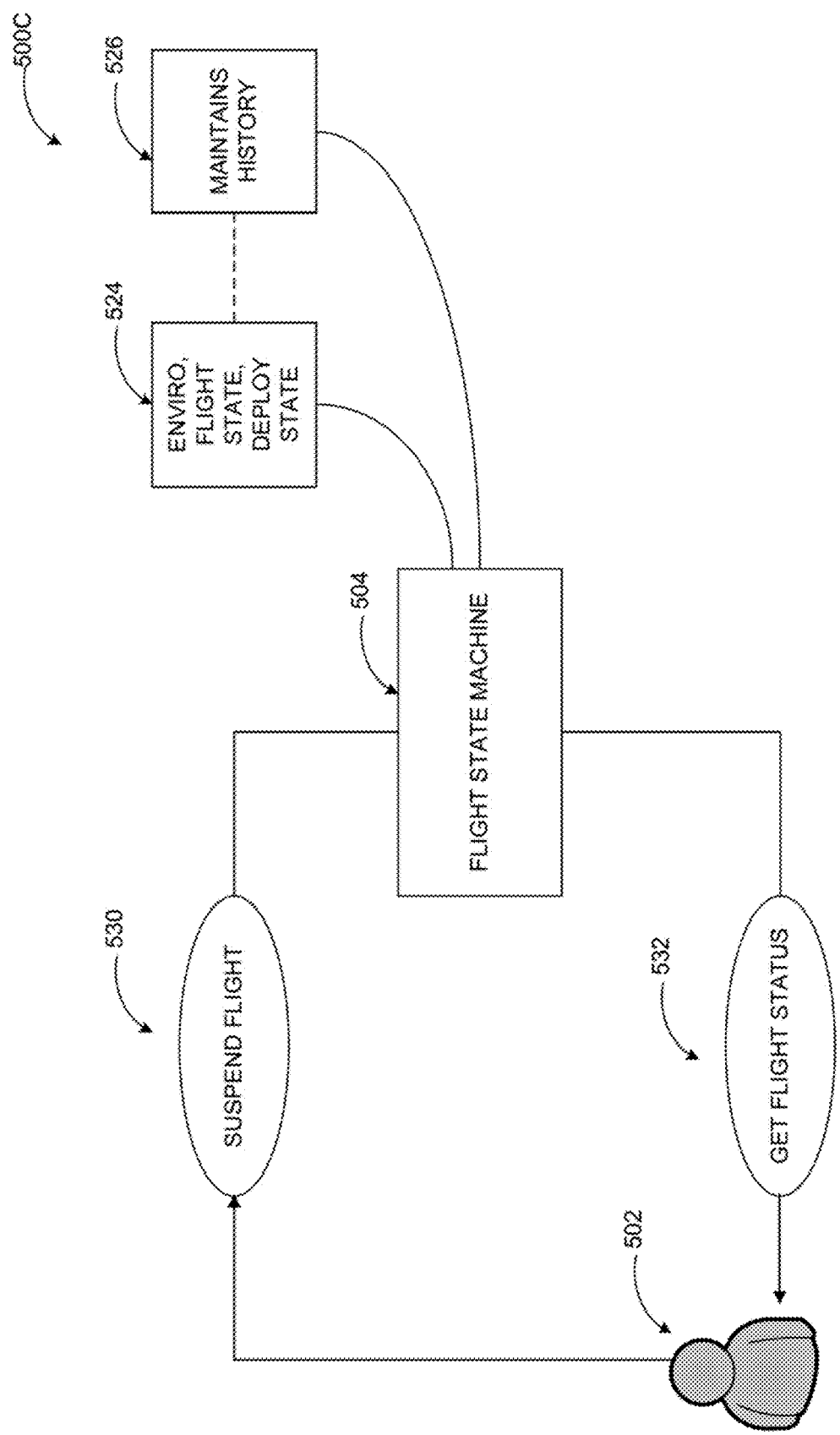

In diagram 500C of FIG. 5C, the flight state machine 504 may receive a flight request from the developer 502 to suspend the flight 530. The developer 502 may suspend the flight 530 in particular deployment environment or in all environments where the flight is active. For example, the user may need to turn off the flight in one or more of the environments in an emergency case. In response, the flight state machine 504 may be configured to retrieve policy associated with the rollout of the feature, determine a flight state and a deployment state of the feature within a current deployment. The flight state may be determined to be suspended, for example, following the request from the developer 502 to suspend the flight 530 (see FIG. 7 for an illustration of the process). The deployment state may be not started if the feature has not yet deployed, deploying if the feature is in the process of deploying, completed if the feature has successfully deployed, or failed if the feature failed to deploy. Based on the policy, the flight state, and the deployment state of the feature the deployment of the feature may be initiated or continued within the current deployment environment or the deployment of the feature may be initiated within a next deployment environment as defined by the policy.

The flight state machine 504 may be configured to collect updated information such as the current deployment environment, the flight state, and the deployment state, among other information 524, to generate a current flight status 532, which may be provided to the developer 502. The flight state machine 504 may be configured to track any activity associated with the flight and/or feature deployment, including the suspension of the flight, to maintain and persist a history 526.

Figure 5D:
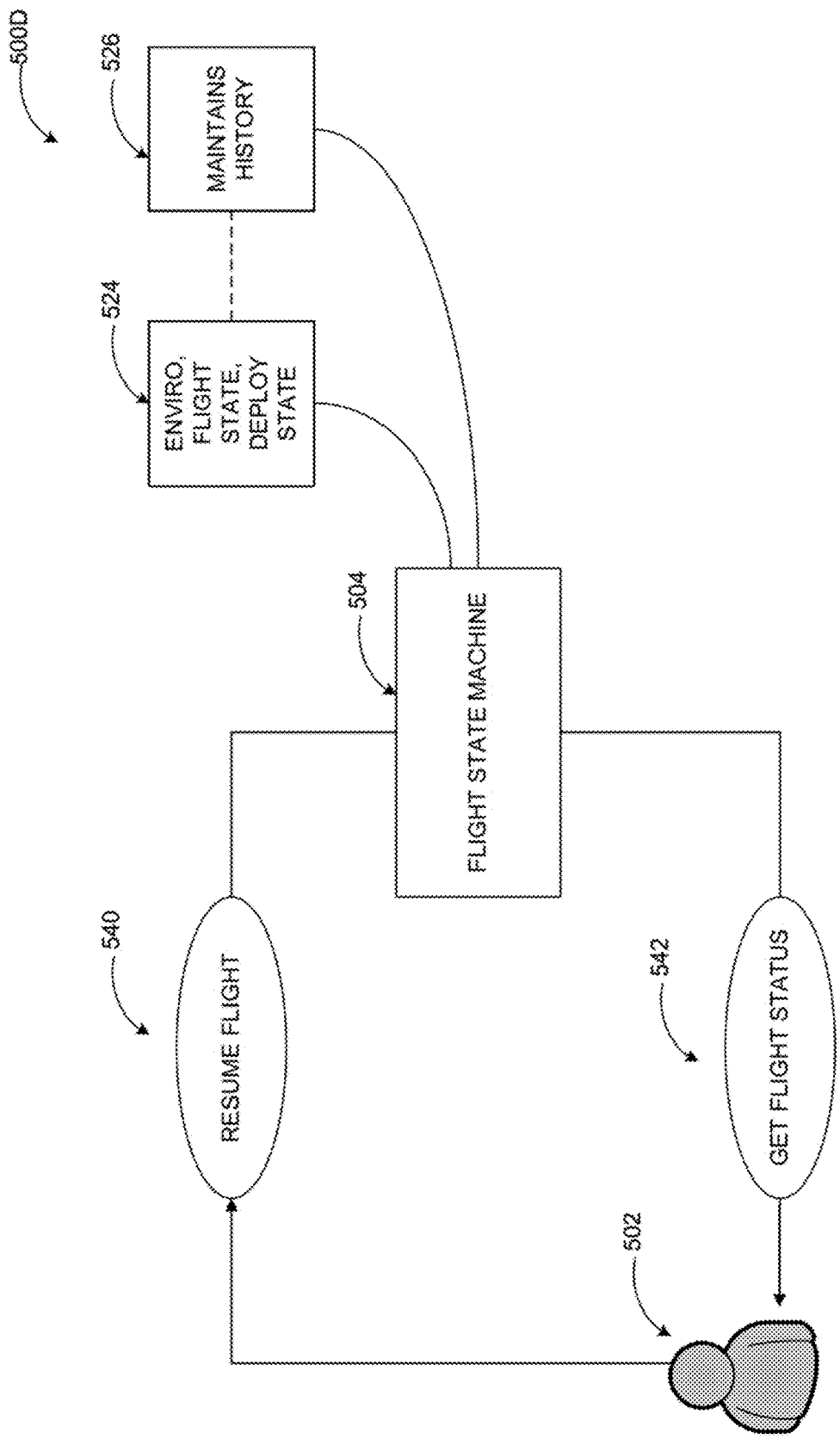

In diagram 500D of FIG. 5D, the flight state machine 504 may be configured to resume a previously suspended flight in response to a flight request from the developer to resume the flight 540. In response, the flight state machine 504 may be configured to retrieve policy associated with the rollout of the feature, determine a flight state and a deployment state of the feature within a current deployment. The flight state may be determined to be active, for example, following the request from the developer 502 to resume the flight 540 (see FIG. 7 for an illustration of the process). The deployment state may be not started if the feature has not yet deployed, deploying if the feature is in the process of deploying, completed if the feature has successfully deployed, or failed if the feature failed to deploy. Based on the policy, the flight state, and the deployment state of the feature the deployment of the feature may be initiated or continued within the current deployment environment or the deployment of the feature may be initiated within a next deployment environment as defined by the policy.

The flight state machine 504 may be configured to collect updated information such as the current deployment environment, flight state, and deployment state, among other information 524, to generate an updated report associated with the flight status 542, which may be provided to the developer 502. The flight state machine 504 may be configured to track any activity associated with the flight and/or feature deployment, including the re-activation of the flight, to maintain and persist a history 526.

Figure 5E:
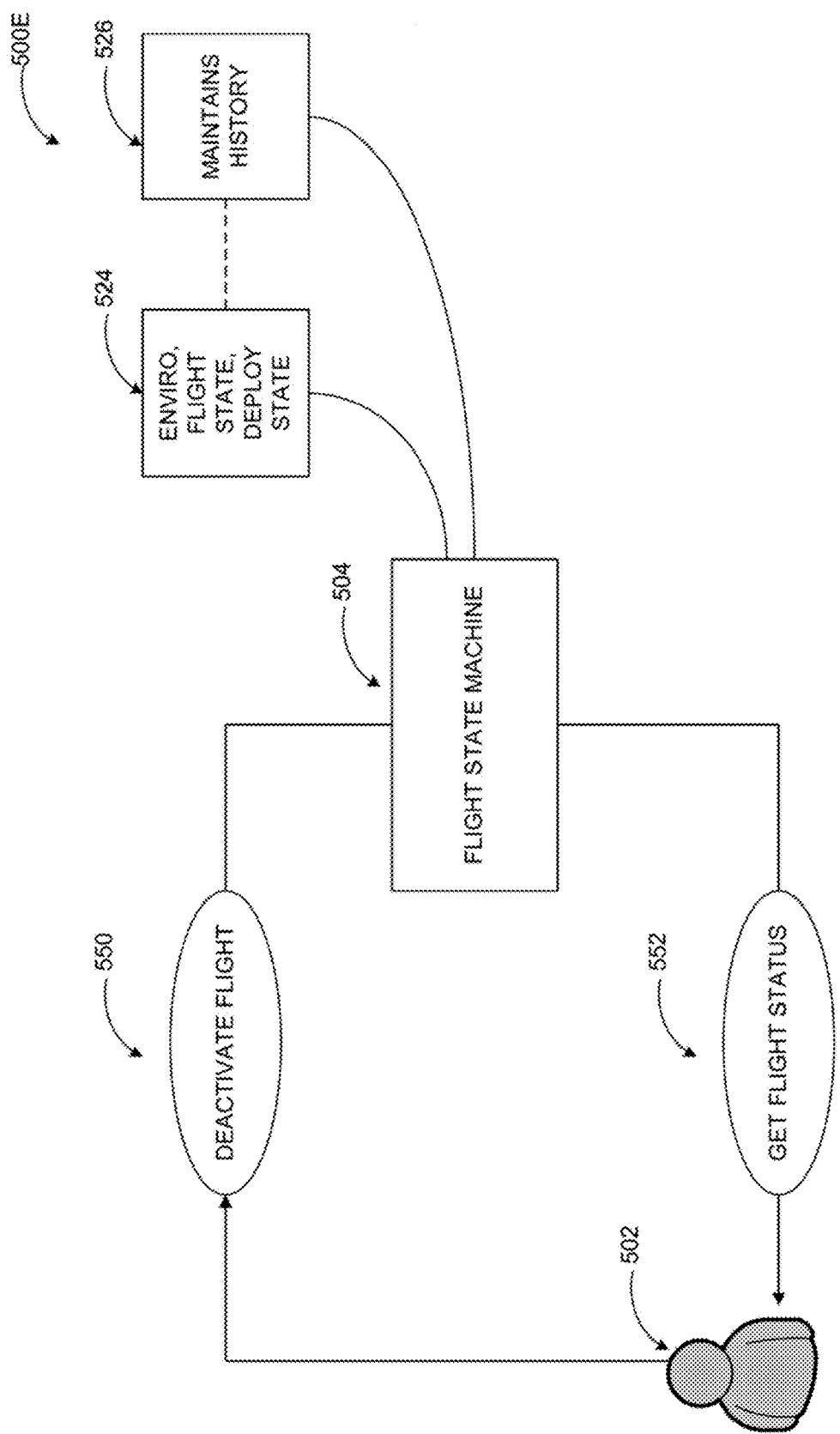

In diagram 500E of FIG. 5E, the flight state machine 504 may be configured to deactivate the previously re-activated flight in response to a flight request from the developer to deactivate the flight 550. The flight may also be deactivated if the flight is expired, for example. In response, the flight state machine 504 may be configured to retrieve policy associated with the rollout of the feature, determine a flight state and a deployment state of the feature within a current deployment. The flight state may be determined to be inactive or expired, for example, following the request from the developer 502 to resume the flight 540. The deployment state may be not started if the feature has not yet deployed, deploying if the feature is in the process of deploying, completed if the feature has successfully deployed, or failed if the feature failed to deploy. Based on the policy, the flight state, and the deployment state of the feature the deployment of the feature may be initiated or continued within the current deployment environment or the deployment of the feature may be initiated within a next deployment environment as defined by the policy.

The flight state machine 504 may be configured to collect updated information such as the current deployment environment, flight state, and deployment state, among other information 524, to generate a current flight status 552, which may be provided to the developer 502. The flight state machine 504 may be configured to track any activity associated with the flight and/or feature deployment, including the deactivation/expiration of the flight, to maintain and persist a history 526.

Figure 5F:
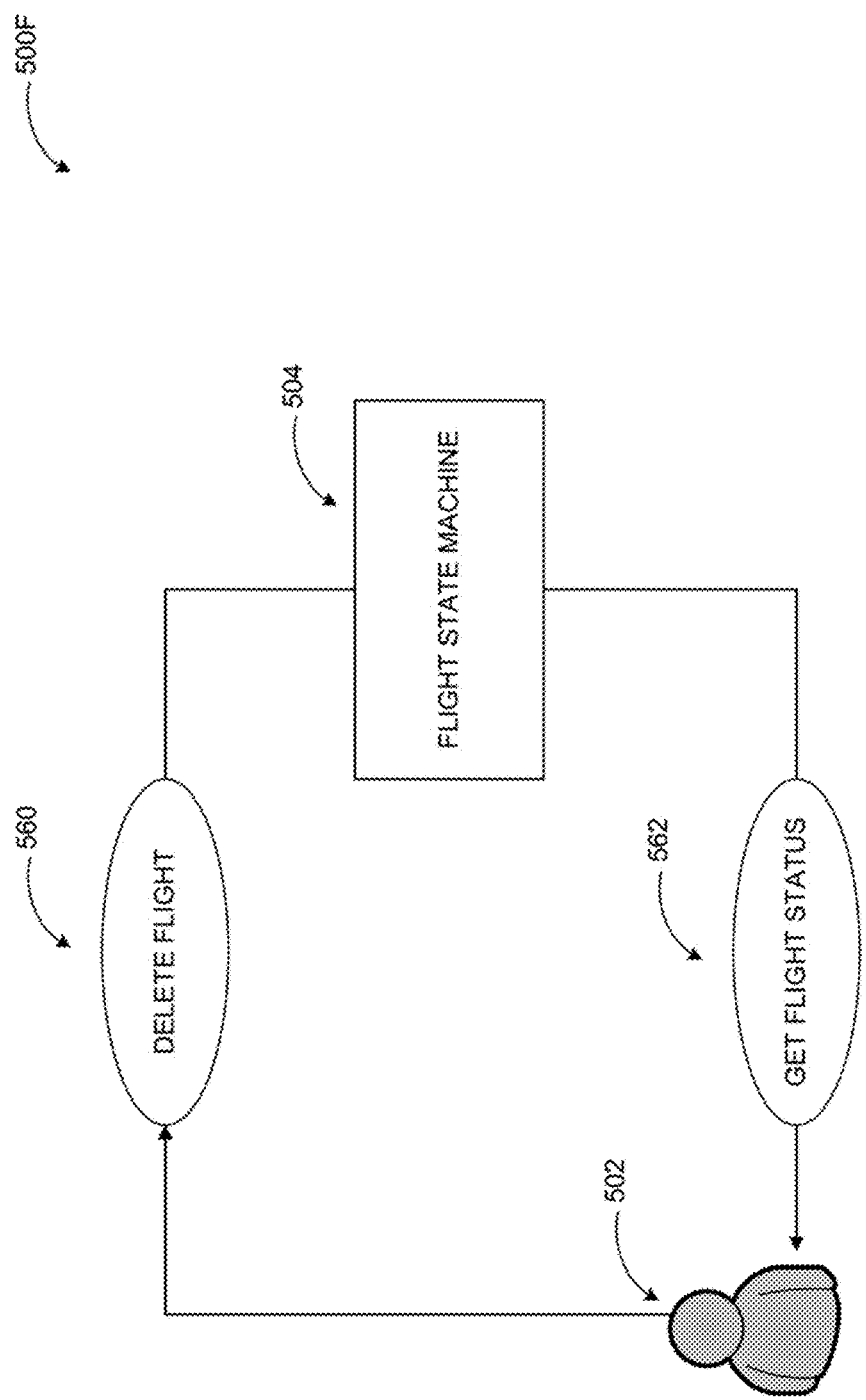

In diagram 500F of FIG. 5F, the flight state machine 504 may be configured to delete the previously deactivated/expired flight in response to a flight request from the developer to delete the flight 560. The flight may be deleted, for example, once the feature has been graduated and code has been removed from a source depot (as discussed in conjunction with FIG. 3). Once deleted, the flight status 562 provided to the developer 502 may contain no information as the code has been removed.

Figure 5G:
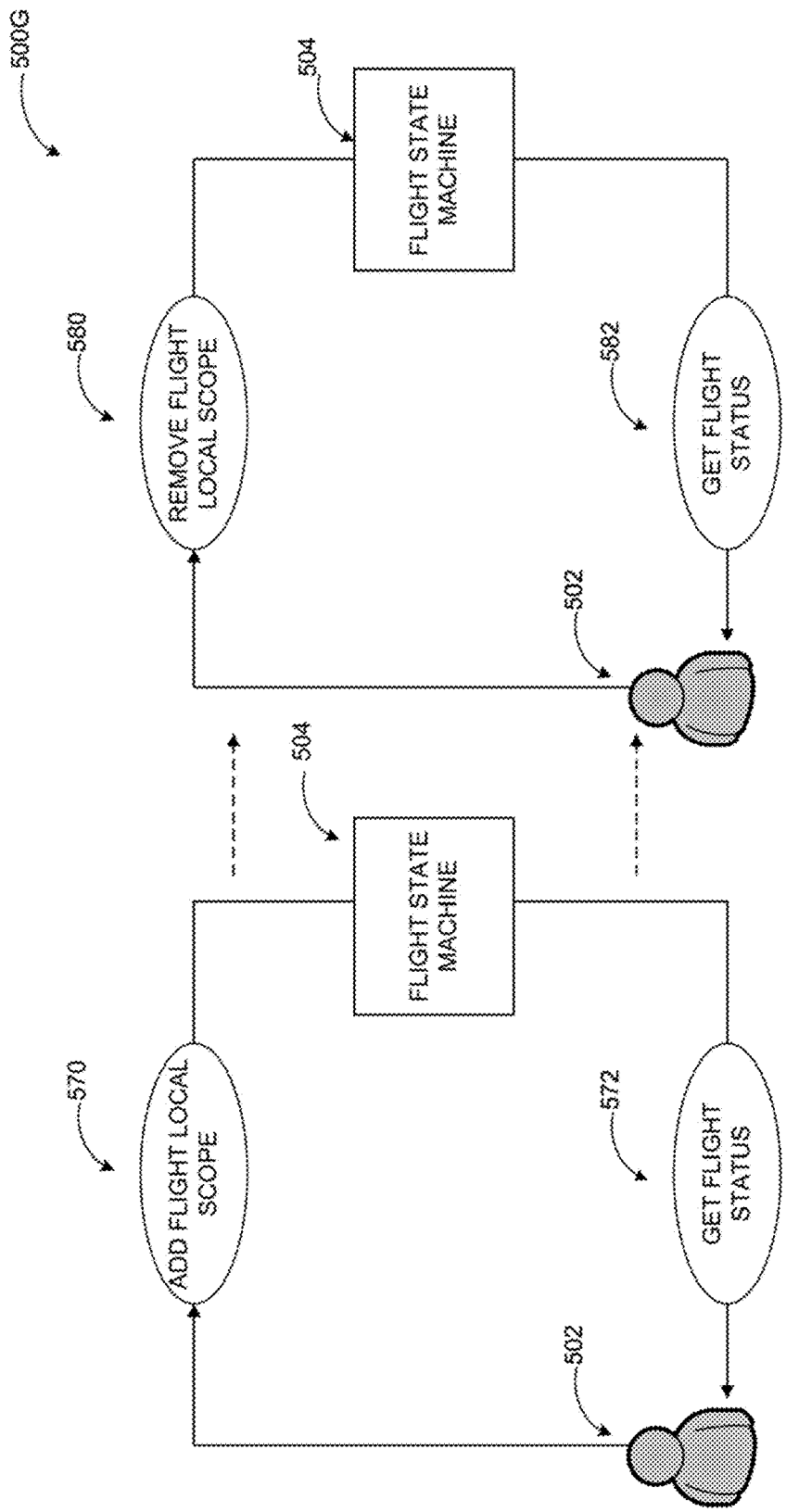

In diagram 500G of FIG. 5G, the flight state machine 504 may be configured employ local scope management in response to receipt of a request from the developer 502 to add local scope 570 to the flight. Employment of local scope management may enable the flight to be tested in limited, low-risk environments. In an example scenario, the developer 502 may select up to 5 individuals to test user local scope flights, 5 tenants to test tenant local scope flights, and/or 5 farms to test "m" local scope flights, where the users are tested first followed by the tenants and then the farms. If the test of the flight is successful within each environment, then the flight may be used for the global rollout of the feature. If the test is not successful, the developer 502 may be configured to adjust and/or modify the flight and retest. The test results may be provided to the developer 502 along with other information provided in the flight status 572.

If local scope management is being employed, the flight state machine 504 may be configured to disable local scope management in response to receipt of a request from the developer 502 to remove local scope 580 to the flight. As a result the testing within the limited, low risk environments may cease, and test results may no longer be provided to the developer 502 along with other information provided in the flight status 582.

Figure 6:
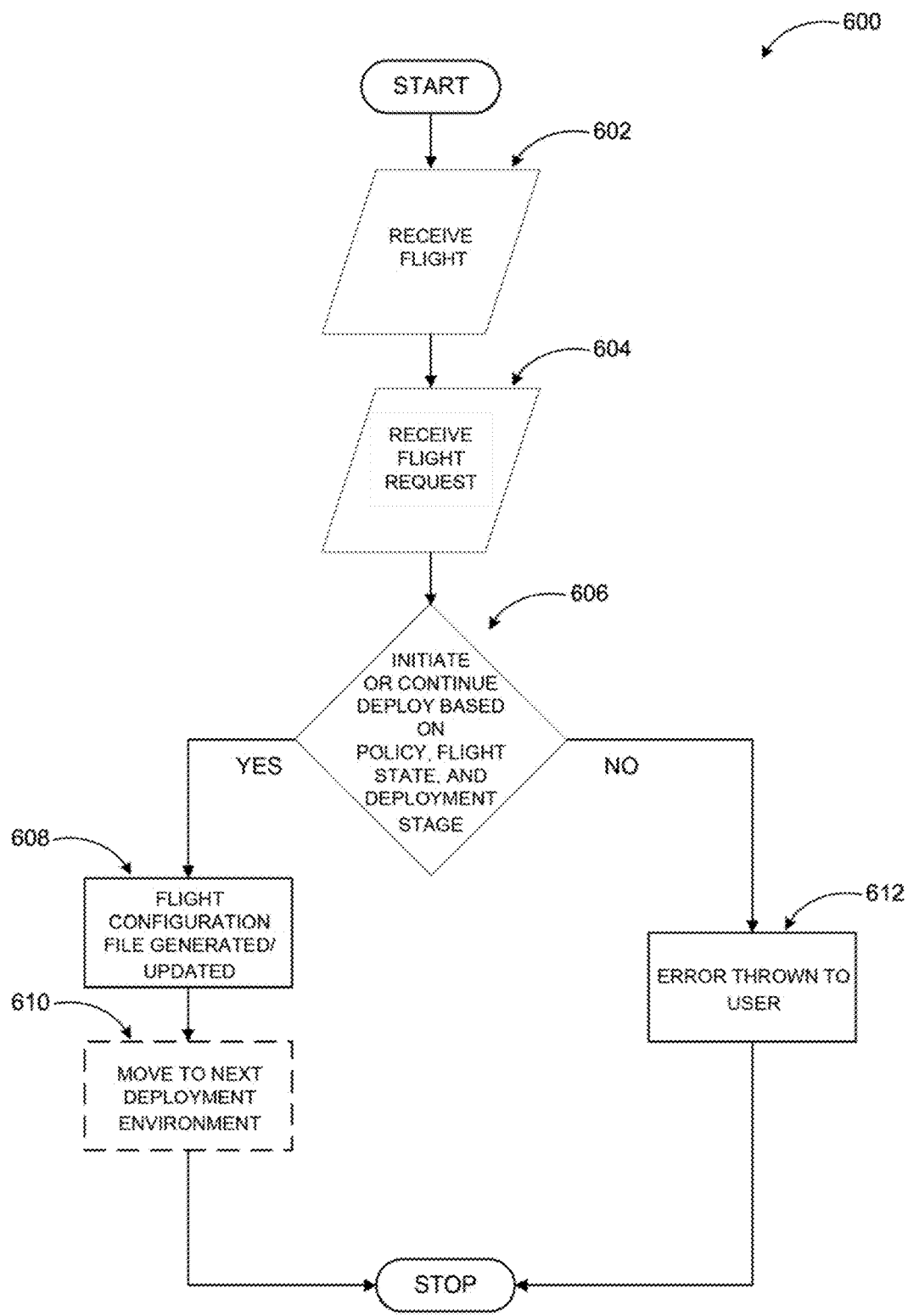
FIG. 6 illustrates a logic flow diagram of a method for gradual feature rollout of a hosted service through policy based flight management.

FIG. 6 illustrates a logic flow diagram of a method for gradual feature rollout of a hosted service through policy based flight management.

A user, such as a software developer, may create a feature for a hosted service. As shown in a diagram 600, a flight state machine of a hosted service may receive a flight associated with the feature 602, where the flight describes a process for how the feature is to be deployed. The flight state machine may then receive a flight request 604, where the flight request may include to advance, deactivate, suspend, resume, or delete the flight. In response to receipt of the flight request, the flight state machine may retrieve a policy associated with rollout of the feature from a policy store, determine a flight state, and determine a deployment state of the feature. The policy may include rules that define properties associated with the rollout of the feature, where the rules may be applicable to the feature itself or applicable to a group of features of which the feature is a member of. In example embodiments, the rules define the deployment environments, criteria for initiating or continuing deployment in a current deployment environment or in a next deployment (such as a validation time period for the deployment of the feature in a current deployment environment, a risk level of the deployment of the feature, and a speed of the deployment of the feature), and a relationship between deployments of the feature and another feature of the hosted service, for example. The flight state may be determined to be created, active, suspended, expired or deleted. The deployment state of the feature may be determined to be not started, deploying, completed or failed.

The flight state machine may then be configured to determine whether or not to initiate or continue deployment of the feature in a current deployment environment or initiate deployment of the feature in a next deployment environment 606. In response to a positive determination, a flight configuration file (i.e., flight status) may be generated or updated 608, and provided to the user. Additionally, if the deployment of the feature is validated in the current deployment environment based on the policy, the flight state, and the deployment stage of the feature, the flight may be moved to the next deployment environment 610 for deployment of the feature. For example, if it is determined that minimum requirements defined by the policy are met according to the flight state and deployment state of the feature to initiate deployment of the feature in the next deployment environment, the flight may be moved to the next deployment environment 610 for deployment of the feature. In response to a negative determination, an error 612 is thrown to the user.

Figure 7:
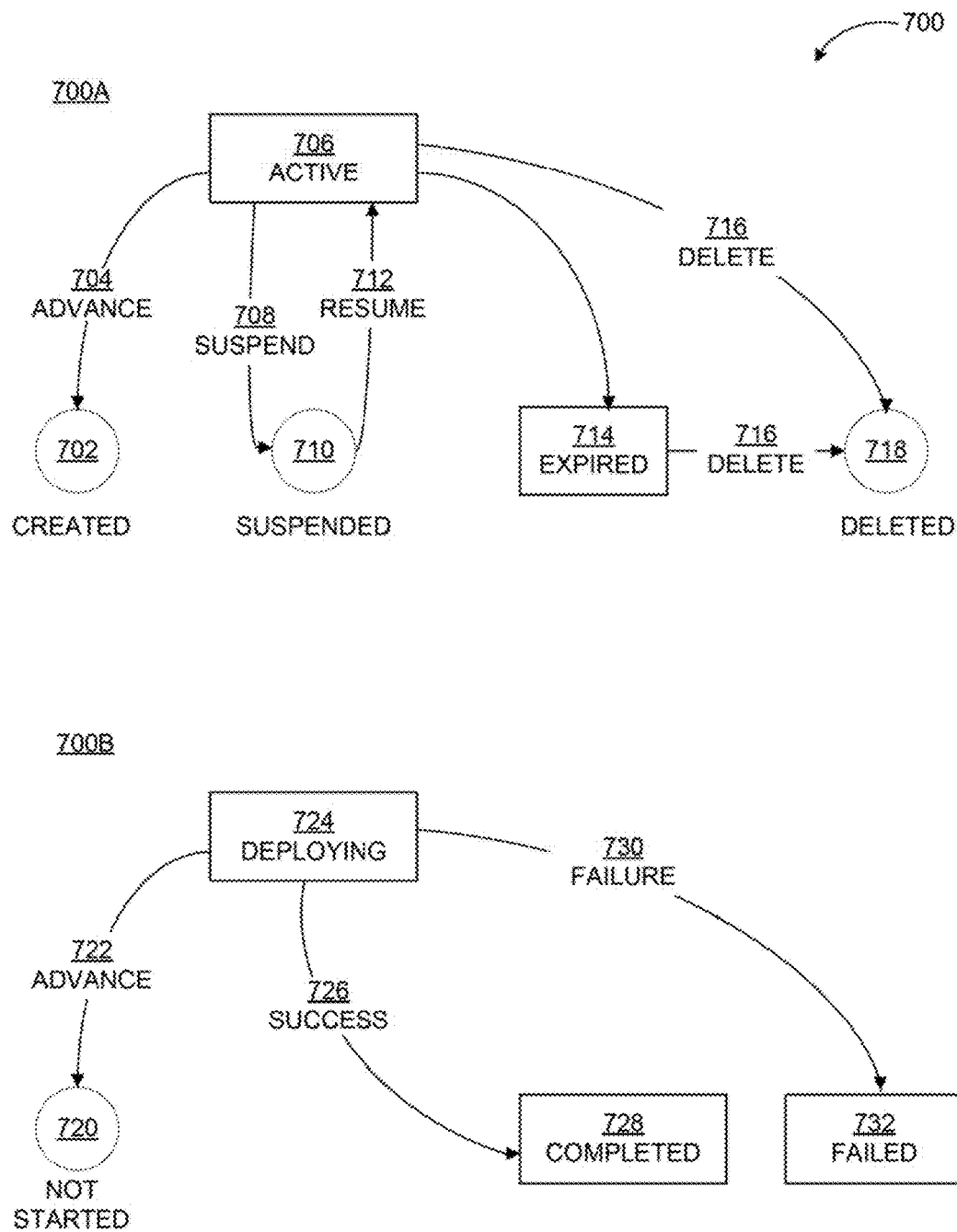
FIG. 7 illustrates examples of flight states and deployment states of a feature.

FIG. 7 illustrates examples of flight states and deployment states of a feature. As previously discussed, a feature of a hosted service may be created by a developer, for example. In response to creation of the feature, a flight state machine of the hosted service may associate the feature with a flight, where the flight describes a process for how the feature is to be deployed. The flight state machine may receive a flight request to advance, suspend, resume, or delete the flight. In response, the flight state machine may receive a policy associated with a rollout of the feature, where the rollout may include one or more deployment environments.

Additionally, the flight state machine may determine a flight state (that is, a current state of the flight). As shown in configuration 700A of diagram 700, possible flight states include created 702, active 706, suspended 710, expired 714, and deleted 718. Once the flight is created 702, a user may submit a flight request to advance 704 the flight to become active 706. In some embodiments, when the flight is active 706, a user may submit another flight request to suspend 708 the flight. The user may suspend 708 the flight in all environments where the flight is on. For example, the user may need to turn off the flight in one or more of the environments in an emergency case. In other examples, the user may suspend 708 the flight to push the deployment of the feature faster. Once suspended 710, the flight is disabled until it is resumed 712 by the user through a further flight request and becomes active 706 again. Although the flight is disabled when suspended 710, the flight state does not change. Instead, the flight state remains suspended 710 until it becomes active 706 again. After a particular amount of time has passed, the flight state may be expired 714. Once expired 714, the user may submit a flight request to delete 716 the flight. In other embodiments, the user may submit the flight request to delete 716 the flight at any other time, irrespective of expiration of the flight. In response, the flight may be deleted 718 and the feature may no longer be deployed. For example, the flight may be permanently deleted through code deletion.

Furthermore, the flight state machine may determine a deployment state of the feature. As shown in configuration 700B of diagram 700, possible deployment stages of the feature include not started 720, deploying 724, completed 728, and failed 732. Initially, the deployment of the feature will have not started 720 within a deployment environment. A user may submit a flight request to advance 722 the flight to start deploying 724 the feature within the deployment environment. If the deployment is a success 726 within the deployment environment, the deployment state of the feature may transition to completed 728. If the deployment is a failure 730 within the environment, the deployment state of the feature may transition to failed 732.

Based on the policy, the flight state, and the deployment state of the feature, the flight state machine may then initiate or continue deployment of the feature within a current deployment environment or initiate deployment of the feature in a next deployment environment. Additionally, a flight configuration file (i.e., a flight status) may be generated or updated, and provided to the user.

Figure 8:
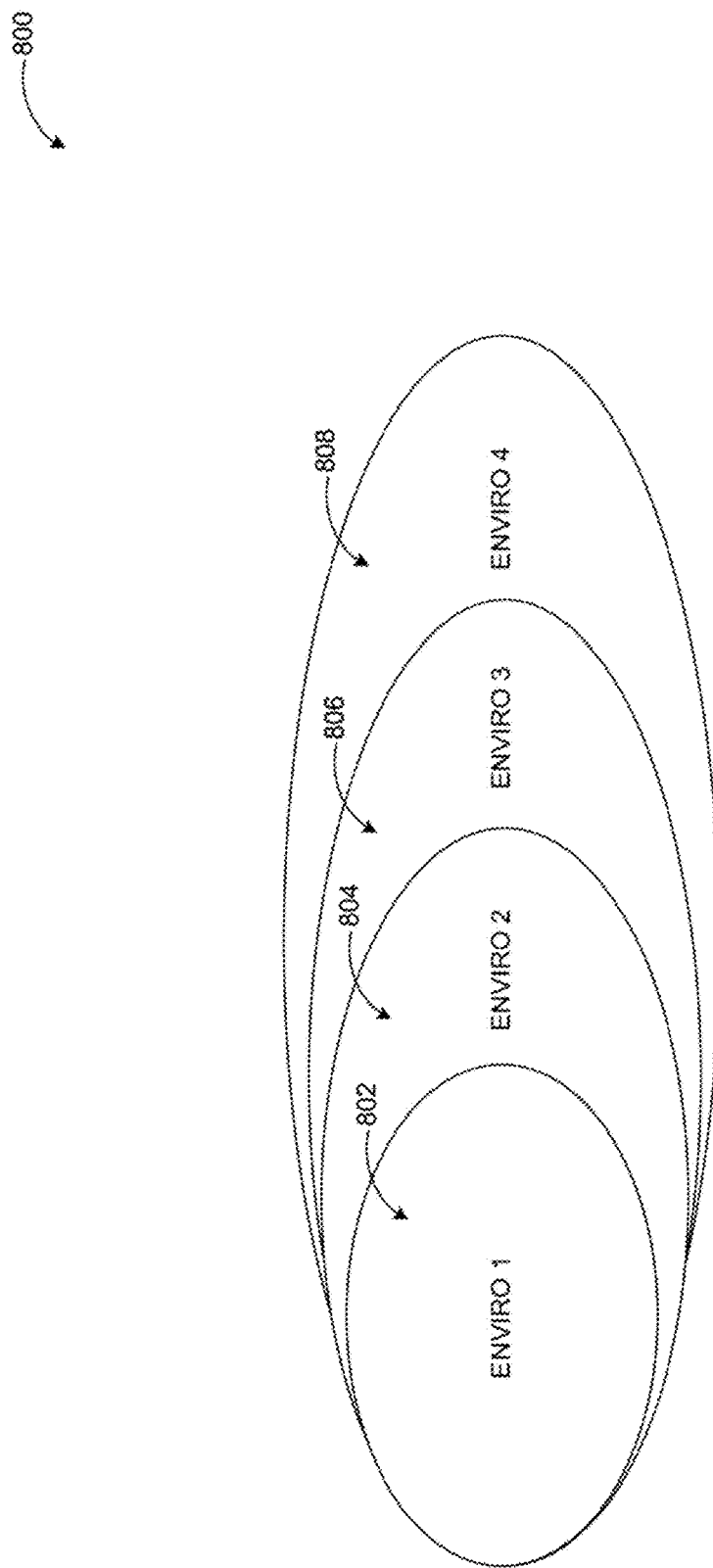
FIG. 8 includes a conceptual diagram illustrating deployment environments of a feature rollout.

FIG. 8 includes a conceptual diagram illustrating deployment environments of a feature rollout. Rollout of a feature of a hosted service may include one or more deployment environments (also referred to as rings, and/or stages) for the feature in order to diminish the risk of deployment issues with the feature as the feature is exposed to a larger number of users. The deployment of the feature may be initiated and/or continued within a current deployment environment or initiated in a next deployment environment based on one or more rules of a policy associated with the rollout, in addition to a flight state and deployment state of the feature within the current deployment environment.

As shown in a diagram 800, an example rollout of the feature may include four deployment environments (e.g., 802-808). A first environment 802 may be a design stage, where only a small group of developers may be exposed to the feature. At this stage, there may be a highest risk of potential issues with the deployment and functioning of the feature within applications of the hosed service. The developers may address such issues by providing updates to the features to improve and/or resolve the issues prior to the feature being deployed to a larger number of users in other environments. Once deployment of the feature is validated within the first environment 802 based on the policy, flight state and deployment stage of the feature, the feature may be deployed in a second environment 804.

The second environment 804, for example, may be a first test stage, where internal users may be exposed to the feature in addition to the developers. A medium risk of potential issues with the deployment and functioning of the feature within applications of the hosed service may still exist within the first stage due to the increased number of users exposed. Any issues may again be addressed by providing updates to the features to improve and/or resolve the issues prior to the feature being deployed to a larger number of users in the next environment. Once deployment of the feature is validated within the second environment 804 based on the policy, flight state, and deployment stage of the feature, the feature may be deployed in a third environment 806.

The third environment 806, for example, may be a second test stage or a "first release", where a small group of external users may be exposed to the feature in addition to the developers and the internal users. A lower risk of potential issues with the deployment and functioning of the feature within applications of the hosed service may exist with the second test stage. However, if any are discovered, they may again be addressed by providing updates to the features to improve and/or resolve the issues prior to the feature being deployed to a larger number of users in the next environment. Once deployment of the feature is validated within the third environment 806 based on the policy, flight state, and deployment stage of the feature, the feature may be deployed in a fourth environment 808.

The fourth environment 808, for example, may be a production stage or a "global release" where the feature may deployed to all external users globally in addition to the developers and the internal users. By this stage, a majority of the potential issues with the deployment and functioning of the feature within applications of the hosed service have been discovered and resolved such that there are much lower risks associated with the deployment of the feature.

The examples provided in FIGS. 1 through 8 are illustrated with specific systems, environments, services, machines, applications, and deployment configurations. Embodiments are not limited to environments according to these examples. Policy driven flight management may be implemented in environments employing fewer or additional specific systems, environments, services, machines, applications, and deployment configurations. Furthermore, the example specific systems, environments, services, machines, applications, and deployment configurations shown in FIG. 1 through 8 may be implemented in a similar manner with other values using the principles described herein.

Figure 9:
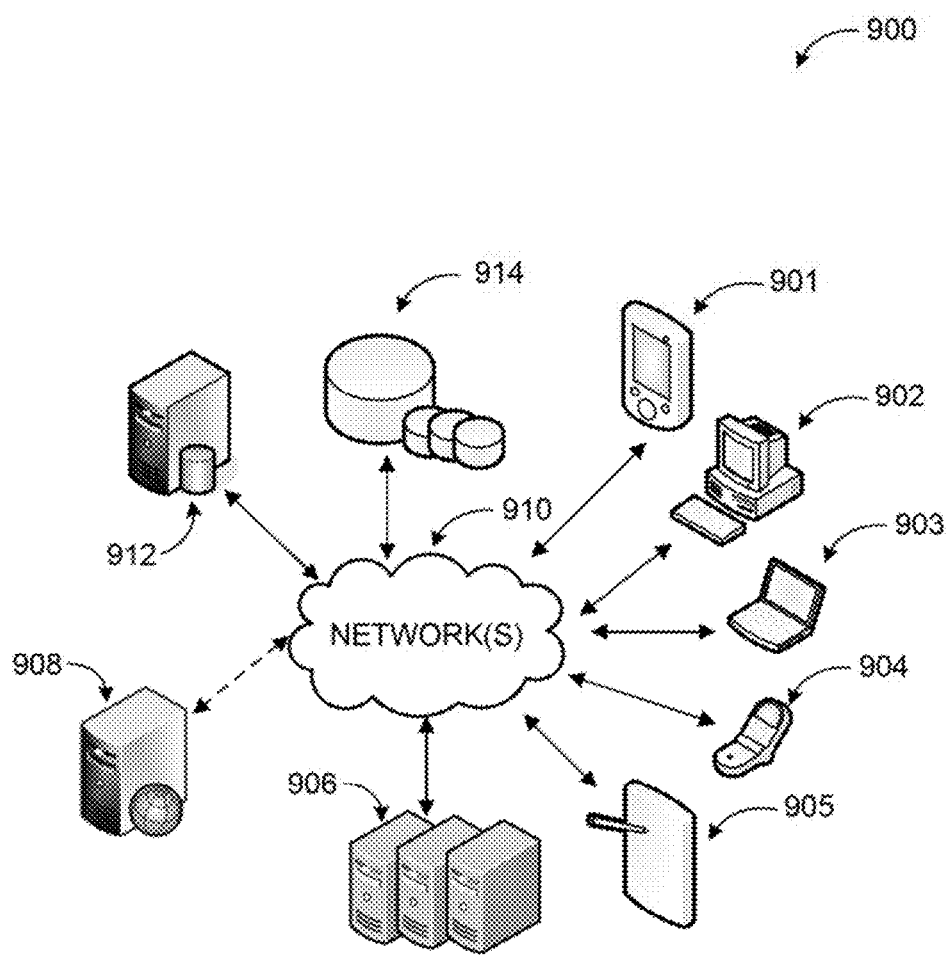
FIG. 9 is a networked environment, where a system according to embodiments may be implemented.

FIG. 9 is a networked environment, where a system according to embodiments may be implemented. In addition to locally installed applications (for example, application 106), a flight state machine may also be employed in conjunction with hosted applications and services (for example, hosted service 114) that may be implemented via software executed over one or more servers 906 or individual server 909, as illustrated in diagram 900. A hosted service or application may communicate with client applications on individual computing devices such as a handheld computer 901, a desktop computer 902, a laptop computer 903, a smart phone 904, a tablet computer (or slate), 905 ('client devices') through network(s) 910 and control a user interface presented to users.

Client devices 901-905 are used to access the functionality provided by the hosted service or application. One or more of the servers 906 or server 908 may be used to provide a variety of services as discussed above. Relevant data may be stored in one or more data stores (e.g. data store 914), which may be managed by any one of the servers 906 or by database server 912.

Network(s) 910 may comprise any topology of servers, clients, Internet service providers, and communication media. A system according to embodiments may have a static or dynamic topology. Network(s) 910 may include a secure network such as an enterprise network, an unsecure network such as a wireless open network, or the Internet. Network(s) 910 may also coordinate communication over other networks such as PSTN or cellular networks. Network(s) 910 provides communication between the nodes described herein. By way of example, and not limitation, network(s) 910 may include wireless media such as acoustic, RF, infrared and other wireless media.

Many other configurations of computing devices, applications, engines, data sources, and data distribution systems may be employed for policy driven flight management. Furthermore, the networked environments discussed in FIG. 9 are for illustration purposes only. Embodiments are not limited to the example applications, engines, or processes.

Figure 10:
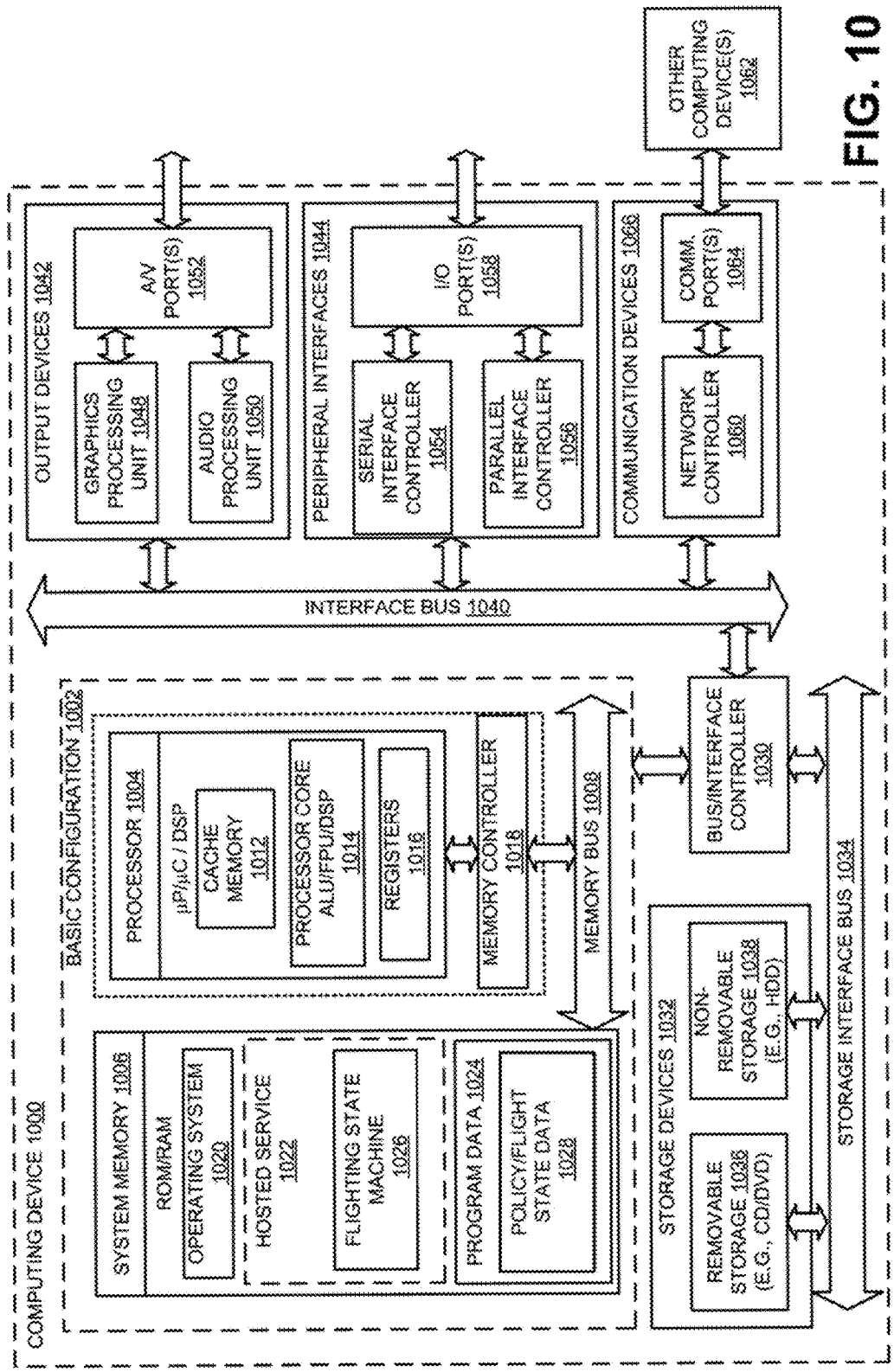
FIG. 10 is a block diagram of an example general purpose computing device, which may be used to provide policy based flight management.

FIG. 10 is a block diagram of an example general purpose computing device, which may be used for policy driven flight management.

For example, computing device 1000 may be used as a server, desktop computer, portable computer, smart phone, special purpose computer, or similar device. In an example basic configuration 1002, the computing device 1000 may include one or more processors 1004 and a system memory 1006. A memory bus 1008 may be used for communicating between the processor 1004 and the system memory 1006. The basic configuration 1002 is illustrated in FIG. 10 by those components within the inner dashed line.

Depending on the desired configuration, the processor 1004 may be of any type, including but not limited to a microprocessor (μP), a microcontroller (μC), a digital signal processor (DSP), or any combination thereof. The processor 1004 may include one more levels of caching, such as a level cache memory 1012, one or more processor cores 1014, and registers 1016. The example processor cores 1014 may (each) include an arithmetic logic unit (ALU), a floating point unit (FPU), a digital signal processing core (DSP Core), or any combination thereof. An example memory controller 1018 may also be used with the processor 1004, or in some implementations, the memory controller 1018 may be an internal part of the processor 1004.

Depending on the desired configuration, the system memory 1006 may be of any type including but not limited to volatile memory (such as RAM), non-volatile memory (such as ROM, flash memory, etc.) or any combination thereof. The system memory 1006 may include an operating system 1020, a hosted service 1022, and program data 1024. The hosted service 1022 may include a flight state machine 1026, which may provide policy based flight management. In response to receipt of a flight request associated with a feature of the hosted service 1022, the flight state machine 1026 may be configured to retrieve a policy associated with rollout of the feature, determine a flight state, and determine a deployment state of the feature. The flight state machine 1026 may then be configured to initiate or continue deployment of the feature in a current deployment environment or initiate deployment of the feature in a next deployment environment based on the policy, the flight state, and the deployment state of the feature. The program data 1024 may include, among other data, policy and flight state data 1028, as described herein.

The computing device 1000 may have additional features or functionality, and additional interfaces to facilitate communications between the basic configuration 1002 and any desired devices and interfaces. For example, a bus/interface controller 1030 may be used to facilitate communications between the basic configuration 1002 and one or more data storage devices 1032 via a storage interface bus 1034. The data storage devices 1032 may be one or more removable storage devices 1036, one or more non-removable storage devices 1038, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1006, the removable storage devices 1036 and the non-removable storage devices 1038 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 1000. Any such computer storage media may be part of the computing device 1000.

The computing device 1000 may also include an interface bus 1040 for facilitating communication from various interface devices (for example, one or more output devices 1042, one or more peripheral interfaces 1044, and one or more communication devices 1046) to the basic configuration 1002 via the bus/interface controller 1030. Some of the example output devices 1042 include a graphics processing unit 1048 and an audio processing unit 1050, which may be configured to communicate to various external devices such as a display or speakers via one or more A/V ports 1052. One or more example peripheral interfaces 1044 may include a serial interface controller 1054 or a parallel interface controller 1056, which may be configured to communicate with external devices such as input devices (for example, keyboard, mouse, pen, voice input device, touch input device, etc.) or other peripheral devices (for example, printer, scanner, etc.) via one or more I/O ports 1058. An example communication device 1046 includes a network controller 1060, which may be arranged to facilitate communications with one or more other computing devices 1062 over a network communication link via one or more communication ports 1064. The one or more other computing devices 1062 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 1000 may be implemented as a part of a general purpose or specialized server, mainframe, or similar computer that includes any of the above functions. The computing device 1000 may also be implemented as a personal computer including both laptop computer and non-laptop computer configurations.

Example embodiments may also include methods for policy driven flight management. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 11:
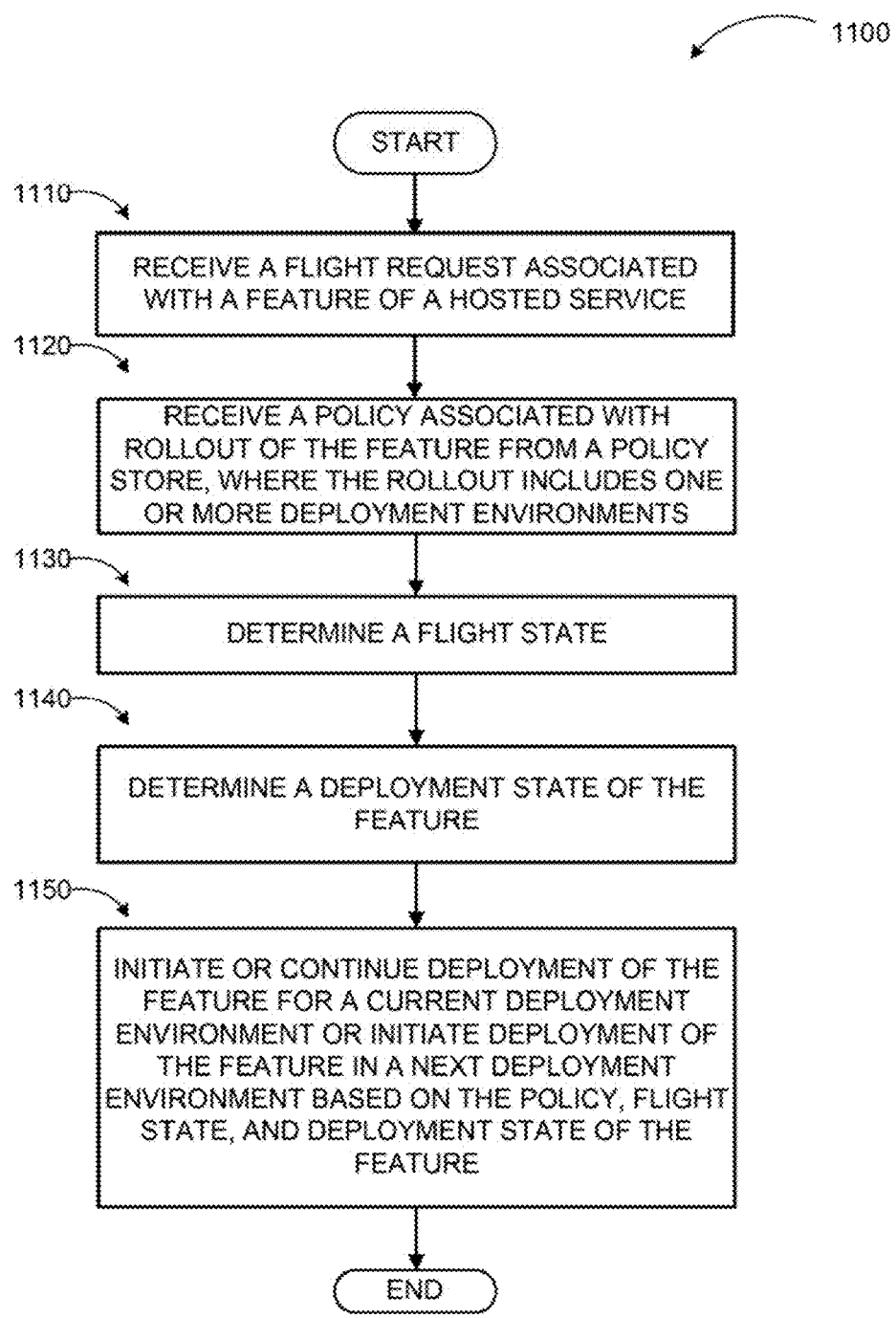
FIG. 11 illustrates a logic flow diagram of a method to provide policy based flight management, according to embodiments.

FIG. 11 illustrates a logic flow diagram of a method for policy driven flight management, according to embodiments.

Process 1100 may be implemented by a flight state machine of a hosted service, a distributed application, and/or their components (e.g., a feature management component, a flight management component, and a policy management component), where the components may be executed on one or more servers or other computing devices, among other examples.

Process 1100 begins with operation 1111, where the flight state machine may be configured to receive a flight request associated with a feature of a hosted service. The flight request may be to advance, suspend, resume, and/or delete a flight associated with the feature, where the flight describes how the feature is to be deployed. In response to receiving the request, operations 1120-1150 may be executed by the flight state machine.

At operation 1120, the flight state machine may be configured to retrieve a policy associated with rollout of the feature from a policy store. The policy store may be located within one or more storage servers of the hosted service, for example. The policy may include rules that define properties associated with the rollout of the feature, where the rules may be applicable to the feature itself or applicable to a group of features of which the feature is a member of. In an example embodiment, the rules may define deployment environments for the rollout, where the feature is to be deployed through the deployment environments in a strategic order. For example, the feature may be first deployed within a low-risk environment consisting of only a few users to ensure the feature deploys smoothly without bugs and/or defects before being deployed in high-risk environments. Other rules may include criteria for initiating or continuing deployment in a current deployment environment or in a next deployment, such as a validation time period for the deployment of the feature in a current deployment environment, a risk level of the deployment of the feature, and a speed of the deployment of the feature. Further rules may include a relationship between deployments of the feature and another feature of the hosted service, for example. In some embodiments, a developer may be enabled to add, modify, and/or delete one or more of the rules of the policy prior to deployment such that the flight and/or deployment strategy, among other things, may be adjusted as needed.

At operation 1130, the flight state machine may be configured to determine a flight state. The flight state may indicate a state of the flight associated with the feature. The flight state may include created, active, suspended, resumed, expired, and/or deleted. At operation 1140, the flight state machine may be configured to determine a deployment state of the feature. The deployment state of the feature may be not started if the feature has yet to be deployed, deploying if the feature is currently deploying, completed if the feature has successfully deployed, or failed if the feature failed to deploy.

At operation 1150, the flight state machine may be configured to either initiate or continue deployment of the feature for a current deployment environment or initiate deployment of the feature in a next deployment environment based on the policy, the flight state, and the deployment state of the feature. In the latter scenario, the deployment of the feature in the current deployment environment must be validated prior to initiating deployment of the feature in the next deployment environment based on the policy, the flight state, and the configuration deployment state of the feature. Additionally, a flight configuration file (i.e., flight status) may be generated or updated for provision to the developer.

The operations included in process 1100 are for illustration purposes. Policy driven flight management may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments means to provide policy driven flight management may be described, where the means may include receiving a flight request associated with a feature of a hosted service, and in response to receiving the flight request: retrieving a policy associated with rollout of the feature from a policy store, where the rollout may include one or more deployment environments; determining a flight state; determining a deployment state of the feature; and initiating or continuing deployment of the feature for a current deployment environment or initiating deployment of the feature in a next deployment environment based on the policy, the flight state, and the configuration deployment state of the feature.

According to some examples, methods to provide policy driven flight management may be described. An example method may include receiving a flight request associated with a feature of a hosted service, and in response to receiving the flight request: retrieving a policy associated with rollout of the feature from a policy store, where the rollout may include one or more deployment environments; determining a flight state; determining a deployment state of the feature; and initiating or continuing deployment of the feature for a current deployment environment or initiating deployment of the feature in a next deployment environment based on the policy, the flight state, and the configuration deployment state of the feature.

In other examples, the feature may be associated with a flight in response to creation of the feature. The flight request may include to advance the flight, suspend the flight, resume the flight, deactivate the flight, or delete the flight. A status of the flight may be tracked. A report may be generated or updated to be provided to a developer of the feature based on the tracked status, where the report may be a flight configuration file. The deployment of the feature may be validated in the current deployment environment prior to initiating deployment of the feature in the next deployment environment based on the policy, the flight state, and the configuration deployment state of the feature.

In further examples, the flight state may be determined to be created, active, suspended, expired, or deleted. The deployment state of the feature may be determined to be not started, deploying, completed, or failed. Options may be provided for a developer to add, modify, and delete one or more rules of the policy. Local scope management may be employed.

According to some embodiments, computing devices to provide policy driven flight management may be described. An example computing device may include a memory configured to store instructions and one or more processors coupled to the memory. The processors may be configured to execute a hosted service in conjunction with the instructions stored in the memory, and the hosted service may include a flight state machine. The flight state machine may be configured to receive a flight request associated with a feature of the hosted service, and in response to receipt of the flight request: retrieve a policy associated with rollout of the feature from a policy store, where the rollout may include one or more deployment environments; determine a state of the flight; determine a deployment state of the feature; and initiate or continue deployment of the feature for a current deployment environment or initiate deployment of the feature in a next deployment environment based on the policy, the state of the flight, and the deployment state of the feature.

In other embodiments, the policy may include rules that define properties associated with the rollout. The rules may be applicable to the feature or may be applicable to a group of features to which the feature is a member of. The rules may define the deployment environments. The rules may also define criteria for initiating the deployment of the feature in the next deployment environment. The criteria may include a validation time period for the deployment of the feature in the current deployment environment, a risk level of the deployment of the feature in the next deployment environment, and a speed of the deployment of the feature. The rules may further define a relationship between the rollout of the feature and a rollout of another feature of the hosted service. The flight state machine may include a feature management component, flight management component, and/or a policy management component.

According to some examples, computer readable memory devices with instructions stored thereon to provide policy driven flight management may be described. Example instructions may include receiving a flight request associated with a feature of a hosted service, and in response to receiving the flight request: retrieving a policy associated with rollout of the feature from a policy store, where the rollout may include one or more deployment environments; determining a flight state; determining a deployment state of the feature; and initiating or continuing deployment of the feature for a current deployment environment or initiating deployment of the feature in a next deployment environment based on the policy, the flight state, and the deployment state of the feature.

In other examples, policies associated with the rollout of the feature for each application within the hosted service may be retrieved from the policy store.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide policy driven flight management, the method comprising:
    receiving a flight request associated with a feature of a hosted service; and
    in response to receiving the flight request:
        retrieving a policy associated with a rollout of the feature from a policy store, wherein the policy includes a rule associated with a property for the rollout that defines at least a current deployment environment and a next deployment environment for the rollout and criteria for when deployment of the feature is initiated in the next deployment environment;
        determining a flight state;
        determining a deployment state of the feature;
        initiating or continuing a deployment of the feature in the current deployment environment based on the policy, the flight state, and the deployment state of the feature;
        testing a success of the rollout of the feature in the current deployment environment, wherein the current deployment environment is a low risk environment consisting of fewer users relative to the next deployment environment;
        based on the test, updating the feature to improve or resolve issues associated with the rollout of the feature prior to the feature being deployed in the next deployment environment;
        in response to determining the criteria for when deployment of the feature is initiated in the next deployment environment is met, initiating deployment of the updated feature in the next deployment environment.

2. The method of claim 1, further comprising:
    in response to creation of the feature, associating the feature with a flight.

3. The method of claim 2, wherein the flight request includes to advance the flight, suspend the flight, resume the flight, deactivate the flight, or delete the flight.

4. The method of claim 2, further comprising:
    tracking a status of the flight.

5. The method of claim 4, further comprising:
    generating or updating a report to be provided to a developer of the feature based on the tracked status, wherein the report is a flight configuration file.

6. The method of claim 1, further comprising:
    validating the deployment of the feature in the current deployment environment prior to initiating deployment of the feature in the next deployment environment based on the policy, the flight state, and the deployment state of the feature.

7. The method of claim 1, wherein determining the flight state comprises:
    determining whether the flight state is created, active, suspended, expired, or deleted.

8. The method of claim 1, wherein determining the deployment state of the feature comprises:
    determining whether the deployment state of the feature is not started, deploying, completed, or failed.

9. The method of claim 1, further comprising:
    providing options for a developer to add, modify, and delete one or more rules of the policy.

10. A computing device to provide policy driven flight management, the computing device comprising:
    a memory configured to store instructions; and
    one or more processors coupled to the memory, the one or more processors configured to execute a hosted service in conjunction with the instructions stored in the memory, wherein the hosted service comprises:
    a flight state machine configured to:
        receive a flight request associated with a feature of the hosted service; and
        in response to receipt of the flight request:
            retrieve a policy associated with a rollout of the feature from a policy store, wherein the policy includes a rule associated with a property for the rollout that defines at least a current deployment environment and a next deployment environment for the rollout and criteria for when deployment of the feature is initiated in the next deployment environment;
            determine a flight state;
            determine a deployment state of the feature;
            initiate or continue a deployment of the feature in the current deployment environment based on the policy, the flight state, and the deployment state of the feature;
            test a success of the rollout of the feature in the current deployment environment, wherein the current deployment environment is a low risk environment consisting of fewer users relative to the next deployment environment;

based on the test, update the feature to improve or resolve issues associated with the rollout of the feature prior to the feature being deployed in the next deployment environment and in response to determining the criteria for when deployment of the feature is initiated in the next deployment environment is met, initiate deployment of the updated feature in the next deployment environment.

11. The computing device of claim 10, wherein the policy comprises additional rules that define other properties associated with the rollout.

12. The computing device of claim 11, wherein the rule and the additional rules are applicable to the feature or are applicable to a group of features to which the feature is a member of.

13. The computing device of claim 10, wherein the criteria for when deployment of the feature is initiated in the next deployment environment includes a validation time period for the deployment of the feature in the current deployment environment, a risk level of the deployment of the feature in the next deployment environment, and a speed of the deployment of the feature.

14. The computing device of claim 11, wherein the additional rules define a relationship between the rollout of the feature and a rollout of another feature of the hosted service.

15. The computing device of claim 10, wherein the flight state machine comprises one or more of a feature management component, flight management component, and a policy management component.

16. A computer readable memory device with instructions stored thereon to provide policy driven flight management, the instructions comprising:

receiving a flight request associated with a feature of a hosted service; and in response to receiving the flight request:

retrieving a policy associated with a rollout of the feature from a policy store, wherein the policy includes a rule associated with a property for the rollout that defines at least a current deployment environment and a next deployment environment for the rollout and criteria for when deployment of the feature is initiated in the next deployment environment;

determining a flight state;

determining a deployment state of the feature;

initiating or continuing a deployment of the feature in the current deployment environment based on the policy, the flight state, and the deployment state of the feature;

testing a success of the rollout of the feature in the current deployment environment, wherein the current deployment environment is a low risk environment consisting of fewer users relative to the next deployment environment;

based on the test, updating the feature to improve or resolve issues associated with the rollout of the feature prior to the feature being deployed in the next deployment environment and in response to determining the criteria for when deployment of the feature is initiated in the next deployment environment is met, initiating deployment of the updated feature in the next deployment environment.

17. The computer readable memory device of claim 16, the instructions further comprising:

retrieving policies associated with the rollout of the feature for each application within the hosted service from the policy store.

* * * * *